United States Patent
Nakamura et al.

(10) Patent No.: US 7,233,137 B2
(45) Date of Patent: Jun. 19, 2007

(54) POWER SUPPLY SYSTEM

(75) Inventors: Junichi Nakamura, Kashiba (JP);
Masahiro Kawamura, Mara (JP);
Yutaka Okada, Yamatokoriyama (JP);
Takeshi Morimoto, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 224 days.

(21) Appl. No.: 10/947,425

(22) Filed: Sep. 23, 2004

(65) Prior Publication Data
US 2005/0068019 A1 Mar. 31, 2005

(30) Foreign Application Priority Data
Sep. 30, 2003 (JP) ............... 2003-340631
Sep. 30, 2003 (JP) ............... 2003-340772
Sep. 30, 2003 (JP) ............... 2003-341350

(51) Int. Cl.
*H01F 17/00* (2006.01)
*H02M 3/335* (2006.01)

(52) U.S. Cl. ........................... 323/355
(58) Field of Classification Search ........ 323/247, 323/251, 255, 256, 258, 355, 358, 359; 363/16, 363/20, 21.01, 21.04, 95, 97, 131
See application file for complete search history.

(56) References Cited

U.S. PATENT DOCUMENTS

| | | | | |
|---|---|---|---|---|
| 4,714,870 A | * | 12/1987 | Nilsson | 323/258 |
| 5,256,955 A | * | 10/1993 | Tomura et al. | 320/110 |
| 5,602,462 A | * | 2/1997 | Stich et al. | 323/258 |
| 5,654,881 A | * | 8/1997 | Albrecht et al. | 363/25 |
| 7,046,526 B2 | * | 5/2006 | Toda et al. | 363/24 |

FOREIGN PATENT DOCUMENTS

| | | |
|---|---|---|
| JP | 63-112198 A | 5/1988 |
| JP | 3-165013 A | 7/1991 |
| JP | 3-235432 A | 10/1991 |
| JP | 04-317527 | 11/1992 |

(Continued)

*Primary Examiner*—Matthew V. Nguyen
(74) *Attorney, Agent, or Firm*—Nixon & Vanderhye, P.C.

(57) ABSTRACT

A power supply system is provided, having: a primary side coil; a power transmission apparatus having a primary side circuit for feeding a pulse voltage resulted from switching a DC voltage which is obtained by rectifying and smoothing a commercial power supply to the primary side coil; a secondary side coil magnetically coupled to the primary side coil; and power reception equipment having a secondary side circuit for rectifying and smoothing voltage induced across the secondary side coil, wherein there is provided a power adjusting section for adjusting a level of power to be transmitted according to power required by the power reception equipment. The power adjusting section has, in the primary side circuit, a carrier wave oscillation circuit for supplying a carrier wave to the primary side coil, a demodulation circuit for demodulating a modulated signal transmitted from the secondary circuit and received by the primary side coil, and a power change-over section for selecting a level of power to be transmitted according to an information signal from the power reception equipment and demodulated by the demodulation circuit. The power adjusting section has, in the secondary side circuit, a modulation circuit for modulating the carrier wave fed from the carrier wave oscillation circuit and received by the secondary side coil with the information signal from the power reception equipment and transmitting the modulated signal.

54 Claims, 24 Drawing Sheets

FOREIGN PATENT DOCUMENTS

| | | |
|---|---|---|
| JP | 6-133476 A | 5/1994 |
| JP | 10-4688 A | 1/1998 |
| JP | 10-097931 | 4/1998 |
| JP | 10-257139 A | 9/1998 |
| JP | 2001-016789 | 1/2001 |
| JP | 2001-292535 A | 10/2001 |
| JP | 2001-309579 A | 11/2001 |
| JP | 2001-339327 A | 12/2001 |
| JP | 2002-26778 A | 1/2002 |
| JP | 2003-224937 A | 8/2003 |

* cited by examiner

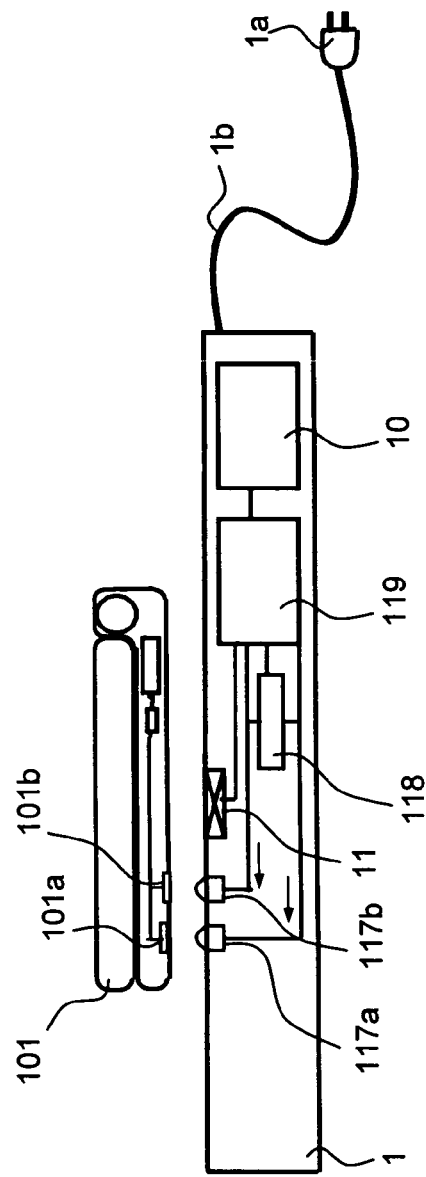
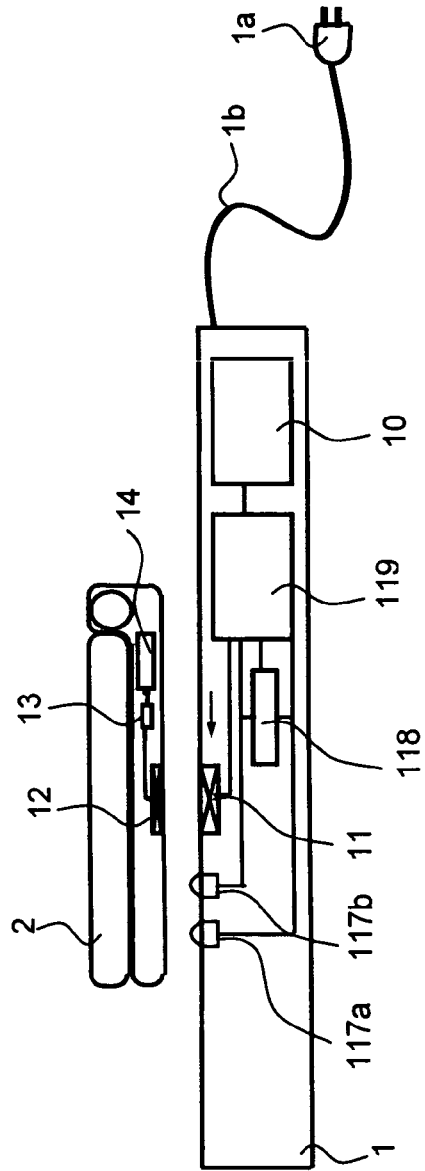
FIG. 10A
FIG. 10B

FIG. 12

| AC CONNECTION AND OPERATION CONDITIONS | LED1 DISPLAY | LED2 DISPLAY |
|---|---|---|
| WHEN AC PLUG IS NOT CONNECTED | OFF | OFF |
| WHEN AC PLUG IS CONNECTED | ON IN RED | OFF |
| WHEN AC PLUG IS CONNECTED WITH NO POWER TRANSMISSION | ON IN RED | OFF |
| WHEN AC PLUG IS CONNECTED WITH SMALL POWER TRANSMISSION (DURING CHARGING) | ON IN YELLOW | ON AND OFF IN RED |
| WHEN AC PLUG IS CONNECTED WITH MEDIUM POWER TRANSMISSION (DURING CHARGING) | ON IN GREEN | ON AND OFF IN RED |
| WHEN AC PLUG IS CONNECTED WITH LARGE POWER TRANSMISSION (DURING CHARGING) | ON IN PURPLE | ON AND OFF IN RED |
| WHEN AC PLUG IS CONNECTED WITH NO POWER TRANSMISSION IN FULL CHARGE | ON IN RED | ON IN GREEN |
| WHEN AC PLUG IS CONNECTED WITH POSITIONAL DEVIATION OF A PREDETERMINED VALUE OR MORE | ON IN ORANGE | OFF |

…

POWER SUPPLY SYSTEM

This non-provisional application claims priorities under 35 U.S.C. §119(a) on Patent Application No. 2003-340631 filed in Japan on Sep. 30, 2003, Patent Application No. 2003-340772 filed in Japan on Sep. 30, 2003, and Patent Application No. 2003-341350 filed in Japan on Sep. 30, 2003, the entire contents of which are hereby incorporated by reference.

TECHNICAL BACKGROUND

1. Technical Field

The present invention relates to a power supply system that supplies power to electronic equipment and, more particularly, to a power supply system that supplies power to mobile electronic equipment such as portable telephones, notebook personal computers, a digital cameras, and electronic toys.

2. Description of the Prior Art

In FIGS. 27 to 29, there are shown examples of a conventional power supply system that supplies power to mobile electronic equipment. FIG. 27 is a view showing an outer appearance of a conventional power supply system performing power supply to a portable telephone. In FIG. 27, a numerical symbol 101 indicates a portable telephone and a numerical symbol 102 indicates a holder of a terminal contact type charger (AC adapter) dedicated for charging a battery built in the portable telephone 101. Attached to the holder 102 of the AC adapter are an AC adapter 102a (integral with an AC plug) and a cord 102b. The AC plug is inserted into a socket provided on a wall surface or the like and thereby a commercial power supply (AC 100 V) is supplied to the AC adapter 102a. The AC adapter 102a converts the supplied AC 100 V to a DC voltage used in charging the battery of the portable telephone 101 and charges the battery of the portable telephone 101 with the DC voltage through the cord 102b, the AC adapter holder 102, and power transmission electrodes that are made contact with power receiving electrodes of the portable telephone 101. The DC voltage can also works directly as a power supply for driving the portable telephone 101.

FIG. 28 is a view showing an outer appearance of another conventional power supply system performing power supply to a notebook personal computer (hereinafter referred to a notebook PC). In FIG. 28, a numerical symbol 103 indicates a notebook PC and a numerical symbol 104 indicates a dedicated charger (AC adapter) for charging a battery built in the notebook PC 103. Attached to the AC adapter 104 are an AC plug 104a, and cords 104b and 104c. The AC plug 104a is inserted into a socket provided on a wall surface or the like, and thereby the commercial power supply (AC 100 V) is supplied to the AC adapter 104 through the cord 104b. The AC adapter 104 converts the supplied AC 100 V to a DC voltage used in charging the battery of the notebook PC 103 and supplies the DC voltage to the notebook PC 103 through the cord 104c to thereby charge the built-in battery. The DC voltage can also works as a power supply for directly driving the notebook PC 103.

FIG. 29 is a view showing an outer appearance of still another conventional power supply system performing power supply to a shaver. In FIG. 29, a numerical symbol 105 indicates a shaver, and a numerical symbol 106 indicates a non-contact dedicated charger (AC adapter) for charging a battery built in the shaver 105. Attached to the AC adapter 106 are an AC plug 106a and a cord 106b. The AC plug 106a is inserted into a socket provided on a wall surface or the like, and thereby the commercial power supply (AC 100 V) is supplied to the AC adapter 106 through the cord 106b. The AC adapter 106 converts the supplied AC 100 V once to a DC voltage, and, thereafter, the DC voltage is subjected to switching and supplied to the battery of the shaver 105 by means of the non-contact power supply using magnetic coupling so as to charge the battery. The DC voltage can also works as a power supply for directly driving the shaver 103.

A non-contact charger is disclosed in Japanese Patent Application Laid-Open No. 2001-16789, in which not only is a secondary side coil installed at the bottom of the body thereof, but a primary side coil is also installed below a body placement section of the charger. When the body is placed on the body placement section of the charger, the primary side coil installed below the body placement section is coupled magnetically to the second side coil installed at the bottom of the body so that a battery located in the body is charged. A housing of the body is constituted of an assembly of plural housing parts obtained by dividing the housing in parallel to a plane to cut the secondary side coil longitudinally, wherein a bottom wall is formed in continuity with the outer peripheral wall of one of the housing parts, and the secondary side coil is provided on the inner surface of the bottom wall, while the outer surface of the bottom wall serves as a contact surface with the body placement section of the charger when charging is performed.

As shown in FIGS. 27 to 29, the dedicated AC adapters, however, are required for charging the electronic equipment such as the portable telephone 101, the notebook PC 103, and the shaver 105, and other AC adapters cannot be used instead. This means that there is no compatibility among AC adapters. Especially, in the case of the portable telephone, dedicated AC adapters are used for respective portable telephones which are different in model or make, thereby providing no compatibility among these AC adapters, only being resulted in inconvenience.

Since there is no compatibility among AC adapters, a problem has arisen that a house is flooded with many AC adapters. In a case where many adapters are present in a house, another problem has arisen that the AC adapters and cords used for connecting the AC adapters to the commercial power supply become impediments to movement of family members.

In a case where equipment is installed on a shelf, such as a personal computer rack, relocating the equipment involves both the equipment and an AC adapter thereof as a set, only resulting in cumbersomeness. A cleaning robot, a toy robot, and the like have to be charged by respective dedicated charging adapters, which requires an operation that each robot is connected to the AC adapter for charging every time.

An AC adapter specially designed for corresponding electronic equipment is necessary to be carried by a person who carries the electronic equipment in a public facility at a destination of travel or in transit, which has greatly devalued portability of the mobile electronic equipment. When an automobile is used for traveling, a charging adapter is attached to a dashboard, a console box, or the like to thereby charge a portable telephone, whereas in such a case, the adapter and a cord thereof become obstacles during driving, and a case arises where a view field of a driver is partly blocked.

In a conventional technology described in Japanese Patent Application Laid-Open No. 2001-16789, since there is no worrisome possibility of level differences occurring among parts bonded at the bottom of the housing, and a spacing between the primary side and secondary side coils can be kept constant, stable charge current can be supplied to the main body of electronic equipment. However, only one designated type of electronic equipment can be charged by the non-contact charger with a problem that the non-contact charger cannot charge plural types of electronic equipment.

In a case where a price for drinking and eating is paid at a cashier after the drinking and eating in eating houses such as a coffee shop, a restaurant, or the like, or in a case where a hotel charge or the like is paid at a front desk when guests check out of accommodations such as hotels and inns, in some cases, the cashier or the front desk is inundated with many guests who come there at a time in order to pay for their bills. In such situations, the cashier or the front desk is crowded, causing a problem of disabling a smooth payment. Moreover, the problem causes a necessity for employees in the eating house or the hotel accommodation to stand by at the cashier or the front desk in order to facilitate a smooth payment.

In a case where a train ticket is purchased from an automatic ticket dispenser, it is necessary to find out a fare to a destination in a fare schedule or the like and then purchase the ticket, which has been problematically cumbersome. In addition, another annoyance accompanies when the ticket is actually purchased, small change has to be carried. On the other hand, there is a payment method already available in which a prepaid card is purchased in advance, and the prepaid card is put through an automatic ticket dispenser installed at a ticket gate in a station, and thereby a charge required for a boarding distance is subtracted from a recorded balance on the prepaid card, whereas a problem has remained unsolved that such a prepaid card is not standardized among railway companies. If passengers change trains and take routes operated by a plurality of companies, many kinds of prepaid cards are required to be at hand for selective use.

BRIEF SUMMARY

In light of the above problems, it is an object of to provide a power supply system capable of not only supplying power to different types of electronic equipment by using a single power transmission apparatus, but also saving space and performing payment for public service and charges.

The present technology is, in order to achieve the object, directed to a power supply system for supplying power, in a non-contact manner, to power reception equipment from a power transmission apparatus to which a commercial power supply is fed, wherein there is provided a power adjusting section for adjusting a level of power to be transmitted according to power required by the power reception equipment. With this configuration, a single power transmission apparatus can supply power to different types of power reception equipment.

According to another aspect of the technology, a power supply system comprises: a primary side coil; a power transmission apparatus having a primary side circuit for feeding a pulse voltage to the primary side coil, the pulse voltage resulting from switching a DC voltage which is obtained by rectifying and smoothing a commercial power supply; a secondary side coil magnetically coupled to the primary side coil; and power reception equipment having a secondary side circuit for rectifying and smoothing an induced voltage induced across the secondary side coil, wherein there is provided a power adjusting section for adjusting a level of power to be transmitted according to power required by the power reception equipment. With this configuration, a single power transmission apparatus can supply power to different types of power reception equipment.

According to still another aspect of the technology, it is preferable that the primary side coil comprise either a coil with a plurality of taps each arranged on the coil at different turns thereof or comprise a plurality of coils each having a different number of turns, and the power adjusting section have a power change-over section for selecting, according to the power required by the power reception equipment, one from among the plurality of taps to which the pulse voltage is applied or have a power change-over section for selecting, according to the power required by the power reception equipment, one from among the plurality of coils to which the pulse voltage is applied. With this configuration, the levels of power transmitted from the power transmission apparatus can be selected depending on the power required by the power reception equipment.

According to still another aspect of the technology, it is preferable that the power adjusting section comprise a carrier wave oscillation circuit, included in the primary side circuit, for regularly supplying a carrier wave to the primary side coil, and a demodulation circuit, included in the primary side circuit, for receiving an information signal through the primary side coil and demodulating the received information signal, the information signal including information regarding the power reception equipment, modulated, and transmitted from the power reception equipment in response to the carrier wave, wherein the power adjusting section adjusts, in accordance with the information signal demodulated by the demodulation circuit, the level of power to be transmitted through a change-over operation performed by the power change-over section. With this configuration, the level of power transmitted from the power transmission apparatus can be adjusted according to the information signal fed from the power reception equipment.

According to still another aspect of the technology, the power transmission apparatus is incorporated in a utensil. Therefore, it is possible to use a single type of power transmission apparatus for feeding power to different types of power reception equipment, thereby making it possible to achieve a power supply system contributing to space saving.

According to still another aspect of the technology, it is preferable that a signal transmission control circuit be provided for transmitting an information signal among the power transmission apparatus, the power reception equipment, and an external apparatus connected to the power transmission apparatus. With this configuration, a power supply system capable of performing payment by using the power reception equipment can be realized.

DESCRIPTION OF THE DRAWINGS

This and other features of the present invention will become clear from the following description, taken in conjunction with the preferred embodiments with reference to the accompanying drawings in which:

FIG. 10A is a block diagram showing an internal construction of a power supply system of a seventh example embodiment;

FIG. 10B is a block diagram showing an internal construction of the power supply system of a seventh example embodiment in another state;

FIG. 12 is a table showing display states of LEDs by operating states of the power transmission apparatus;

DESCRIPTION OF THE PREFERRED EMBODIMENTS

Figure 1A:
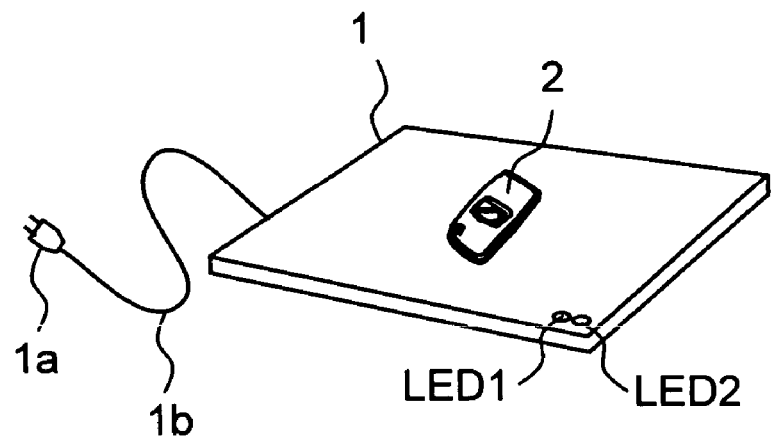
FIG. 1A is a view showing an outer appearance of an example embodiment of a power supply system.
Figure 1B:
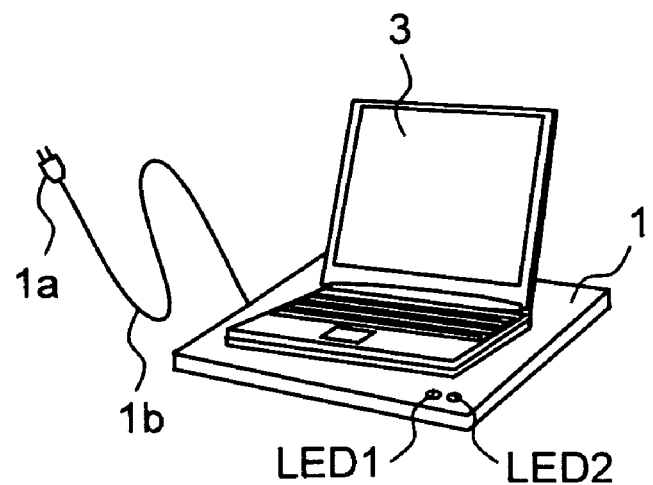
FIG. 1B is a view showing an outer appearance of an example power supply system in another state.

Description will be given of an embodiment of the present invention below with reference to the accompanying drawings. FIGS. 1A and 1B are views showing outer appearances of power supply systems embodying the present invention. In FIGS. 1A and 1B, a numerical symbol 1 indicates a power transmission apparatus for supplying power. FIG. 1A shows a case where power reception equipment is a portable telephone 2, and FIG. 1B shows a case where the power reception equipment is a notebook PC 3. The power transmission apparatus 1 is equipped with an AC plug 1a and a cord 1b. The AC plug 1a is inserted into a socket provided on a wall surface or the like to thereby feed a commercial power supply (AC 100 V) to the power transmission apparatus 1 through the cord 1b. The power transmission apparatus 1 converts the supplied AC 100 V to a DC voltage, thereafter, the DC voltage is subjected to switching and supplied to a battery of the portable telephone 2 or the notebook PC 3, which is power reception equipment, so that the battery is charged by means of the non-contact power supply using magnetic coupling. The DC voltage can be also used as a power supply for directly driving the portable telephone 2 and the notebook PC 3.

Since the power transmission apparatus 1 has functions of recognizing power reception equipment placed on the power transmission apparatus 1 so as to transmit power necessary for the power reception equipment thereto depending on the type, a single power transmission apparatus 1 can charge even batteries of electronic equipment differing in power required for charging, such as the portable telephone 2 and the notebook PC 3. Though not shown, any type of electronic equipment equipped with a battery, such as a digital camera, a camcorder, a PDA, or the like, can be charged similarly. The power transmission apparatus 1 is equipped with light emitting diodes (display section) LED1 and LED2 (hereinafter referred to simply as LED1 and LED2) indicating an input state of AC 100 V, a state of power supply to power reception equipment, and other information. Description will be given of functions, operations, and others of the LED1 and LED2 later.

Figure 2A:
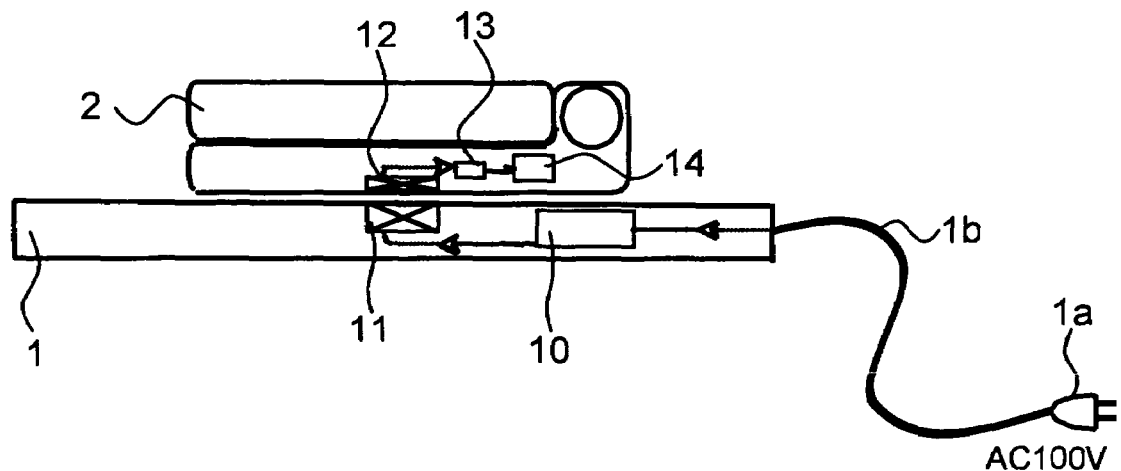
FIG. 2A is a representation for describing a schematic construction of the interior of a power transmission apparatus and a portable telephone shown in FIG. 1A.
Figure 2B:
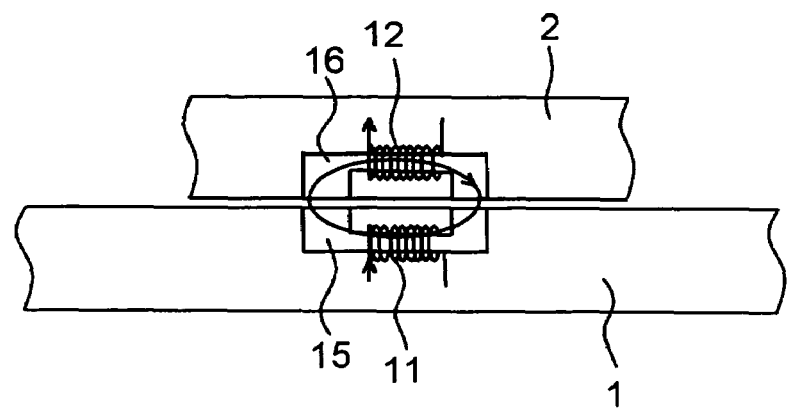
FIG. 2B is an enlarged view showing coil portions in the interior of the power transmission apparatus and the portable telephone shown in FIG. 2A.

Next, description will be given of a principle of a non-contact transmission system with reference to FIGS. 2A and 2B. FIGS. 2A and 2B are schematic diagrams for describing schematic constructions of the interiors of the power transmission apparatus 1 and the portable telephone 2 shown in FIG. 1A. FIG. 2A is an entire view showing the power transmission apparatus 1 and the portable telephone 2. FIG. 2B shows an enlarged view of coil portions. In FIGS. 2A and 2B, the same constituents as in FIG. 1 are attached with the same symbols and descriptions thereof will not be given herein. As shown in FIG. 2A, the power transmission apparatus 1 includes a primary side circuit 10 and a primary side coil 11, and the portable telephone 2 includes a secondary side coil 12, a secondary side circuit 13, and a charge control circuit 14.

The primary side circuit 10 full-wave rectifies and smoothes AC 100 V supplied through the AC plug 1a and the cord 1b to convert the AC 100 V once to a DC voltage, and thereafter the DC voltage is subjected to switching to obtain a pulse voltage which is then supplied to the primary side coil 11. The primary side coil 11 and the secondary side coil 12 constitute a transformer through magnetic coupling between a primary side core (ferrite) 15 and a secondary side core (ferrite) 16, wherein when the pulse voltage obtained by switching is applied across the primary side coil 11, a voltage is induced across the secondary side coil 12 by magnetic coupling depending on a turns ratio between the primary side coil 11 and the secondary side coil 12. The induced voltage is rectified to a DC voltage and smoothed in the secondary side circuit 13; the resultant DC voltage is supplied to a charge control circuit 14; and the charge control circuit 14 charges a battery with the supplied DC voltage. In this way, a non-contact power supply is performed from the power transmission apparatus 1 to the portable telephone 2.

A signal including information such as information regarding power supply or the like is transmitted between the primary side circuit 10 and the secondary side circuit 13 by the non-contact transmission method. The transmission of the signal is performed for the purposes described below. First, when power is transmitted in a state where a piece of metal or the like is placed on the power transmission apparatus 1, a problem arises that the piece of metal produces heat due to occurrence of an eddy current therein. Therefore, the signal is transmitted to recognize whether or not equipment that can receive power is placed. Second, in order to transmit necessary power for the power reception equipment, the power transmission apparatus 1 side should perform a change-over selection from among coils and circuits. Therefore, the power transmission apparatus 1 should recognize information regarding power required by the power reception equipment. Third, when the power reception equipment is fully charged, it is necessary to cease power transmission (for saving energy). Therefore, the power transmission apparatus 1 should recognize whether or not the full charge is achieved.

Figure 3:
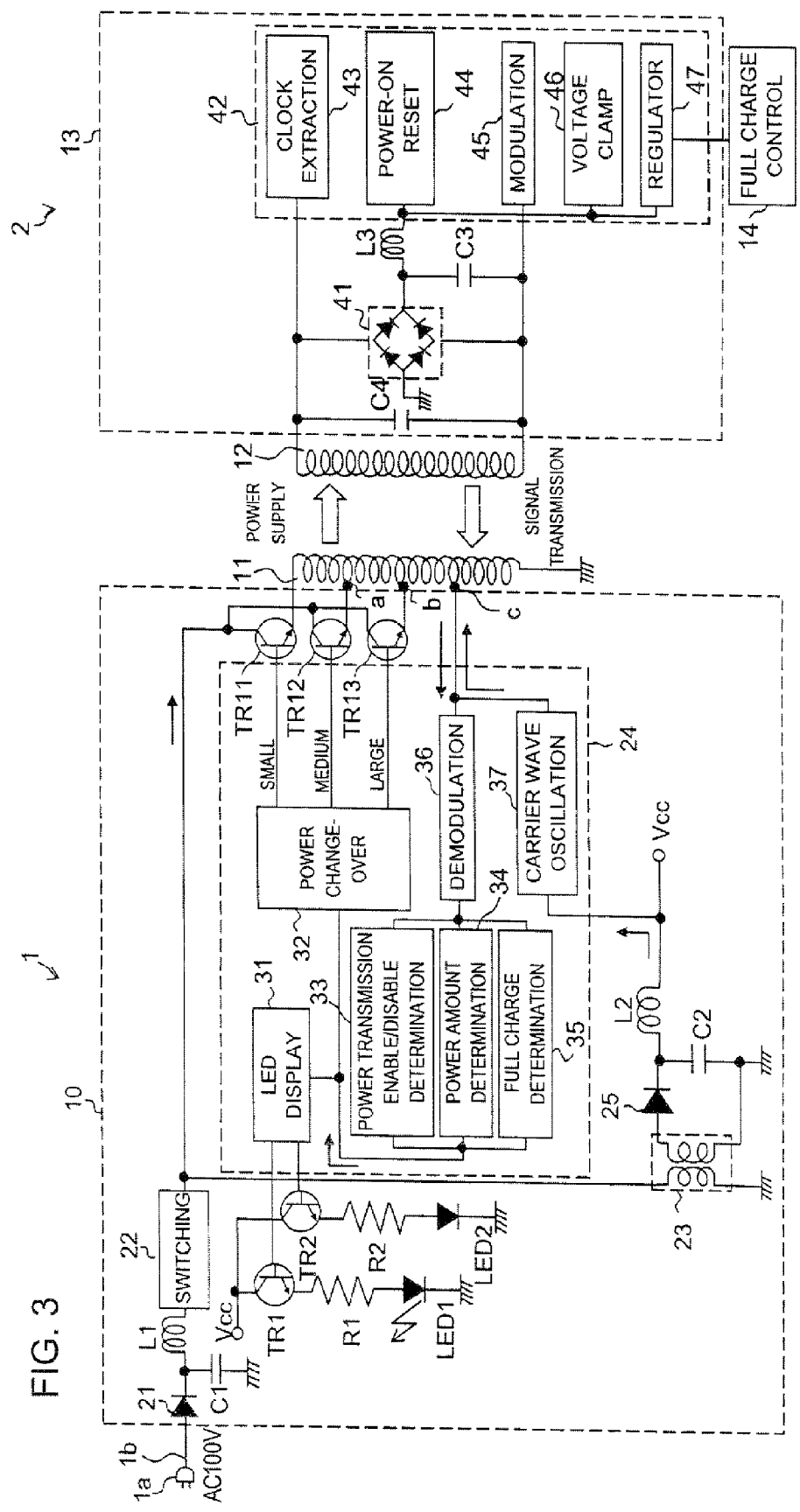
FIG. 3 is a block diagram showing an electric configuration of a power supply system of a first example embodiment.

FIG. 3 is a block diagram showing an electric configuration of a power supply system of a first example embodiment. In FIG. 3, the same constituents as in FIGS. 1A, 2A, and 2B are attached with the same symbols and descriptions thereof will not be given herein.

In FIG. 3, a commercial power supply (AC 100 V) is externally fed from the AC plug 1a through the cord 1b, and the supplied AC 100 V is full-wave rectified in a rectification circuit 21 in the primary side circuit 10 and thereafter smoothed in a smoothing circuit constituted of a coil L1 and a capacitor C1 so as to be converted into a DC voltage. A pulse voltage obtained by subjecting the DC voltage to switching in a switching circuit 22 is supplied to the primary side coil 11 through transistors (power change-over section) TR11, TR12, and TR13.

All of the transistors TR11, TR12, and T13 are NPN-type transistors, and collectors thereof are all connected to an output terminal of the switching circuit 22. An emitter of the transistor TR11 is connected to one end of the primary side coil 11 and the other end of the primary side coil 11 is grounded. The primary side coil 11 has taps a, b, and c in the descending order of a distance from the grounded coil end, i.e., in the descending order of the number of turns. An emitter of the transistor TR12 is connected to the tap a, and an emitter of the transistor TR13 is connected to the tap b. The tap c is connected to a demodulation circuit 36 and a carrier wave oscillation circuit 37 in a power transmission control IC (power adjusting section) 24 that performs power transmission control of the primary side circuit 10.

Bases of the transistors TR11, TR12, and TR13 are all connected to a power change-over circuit (power change-over section) 32 in the power transmission control IC 24. The power transmission control IC 24 is an IC including a LED display circuit 31, the power change-over circuit 32, a power transmission enable/disable determination circuit 33, a power amount determination circuit 34, a full-charge determination circuit 35, a demodulation circuit 36, and the carrier wave oscillation circuit 37, and takes on a shape of an IC chip for achieving a compact and lower-profile shape. Description will be given of functions and operations of the respective circuits later. Note that the transistors TR11, TR12, and TR13 may be replaced with different switching elements such as MOSFETs, selector switches, or the like.

The pulse voltage obtained by switching in the switching circuit 22 is supplied to the transformer 23 as well. Then, the pulse voltage is converted to a predetermined voltage by the transformer 23, rectified by the rectification circuit 25, and smoothed by a smoothing circuit constituted of a coil L2 and a capacitor C2 so as to be converted to a DC voltage. The DC voltage is applied to control circuits and the like in the primary side circuit 10 as a power supply Vcc for controlling the primary side circuit 10.

The collectors of the NPN-type transistors TR1 and TR2 are connected to the power supply Vcc, the emitter of the transistor TR1 is connected to an anode of the LED1 through a current limiting resistor R1, and a cathode of the LED1 is grounded. On the other hand, the emitter of the transistor TR2 is connected to an anode of the LED2 through a current limiting resistor R2, and a cathode of the LED2 is grounded. The bases of the transistors TR1 and TR2 are connected to the LED display circuit 31 in the power transmission control IC 24.

By this configuration, when the LED display circuit 31 turns on the transistor TR1, the LED 1 emits light, and when the LED display circuit 31 turns on the transistor TR2, the LED2 emits light. The LED1, under control of an unillustrated lighting control circuit or the like, emits light in red, yellow, green, purple, or orange according to a signal from the LED display circuit 31. The LED2 also has a function of emitting light in red or green in a similar manner. Note that the transistors TR1 and TR2 may be different switching elements such as MOSFETs or the like.

Next, description will be given of the portable telephone 2 side. A smoothing capacitor C4 and a rectification circuit 41 are connected to both ends of the secondary side coil 12, and an induced voltage across the secondary side coil 12 is full-wave rectified in the rectification circuit 41 and, thereafter, smoothed by a smoothing circuit constituted of a coil L3 and a capacitor C3 and converted to a DC voltage. The DC voltage is supplied to a power-on reset circuit (carrier wave detection circuit) 44, a power clamp circuit 46, and a regulator 47 in a power receiving side control IC (power adjusting section) 42 that performs power receiving control of the secondary side circuit 13.

The power-on reset circuit 44 is a circuit that detects a DC voltage obtained by converting a carrier wave transmitted from the primary side circuit 10 described later and thereby, determines that a request for an information signal has been issued from the power transmission apparatus 1 so as to reset the power receiving control IC 42 to cause transmission of the information signal to be started. The voltage clamp circuit 46 is a circuit in which the DC voltage obtained by the conversion is clamped at a predetermined voltage to thereby prevent circuits from being subjected to voltage breakdown, and the regulator 47 converts the DC voltage obtained by the conversion to a predetermined voltage used for charging and supplies the predetermined voltage to the charge control circuit 14. The power receiving control IC 42 is further provided with a clock extraction circuit 43 connected to the secondary side coil 12 and a modulation circuit 45, and performs a signal processing for a signal transmitted through the primary side coil 11 and the secondary side coil 12. Note that the power receiving control IC 42 is in the shape of an IC chip so that a compact and lower-profile shape of the portable telephone 2 is achieved.

Figure 4:
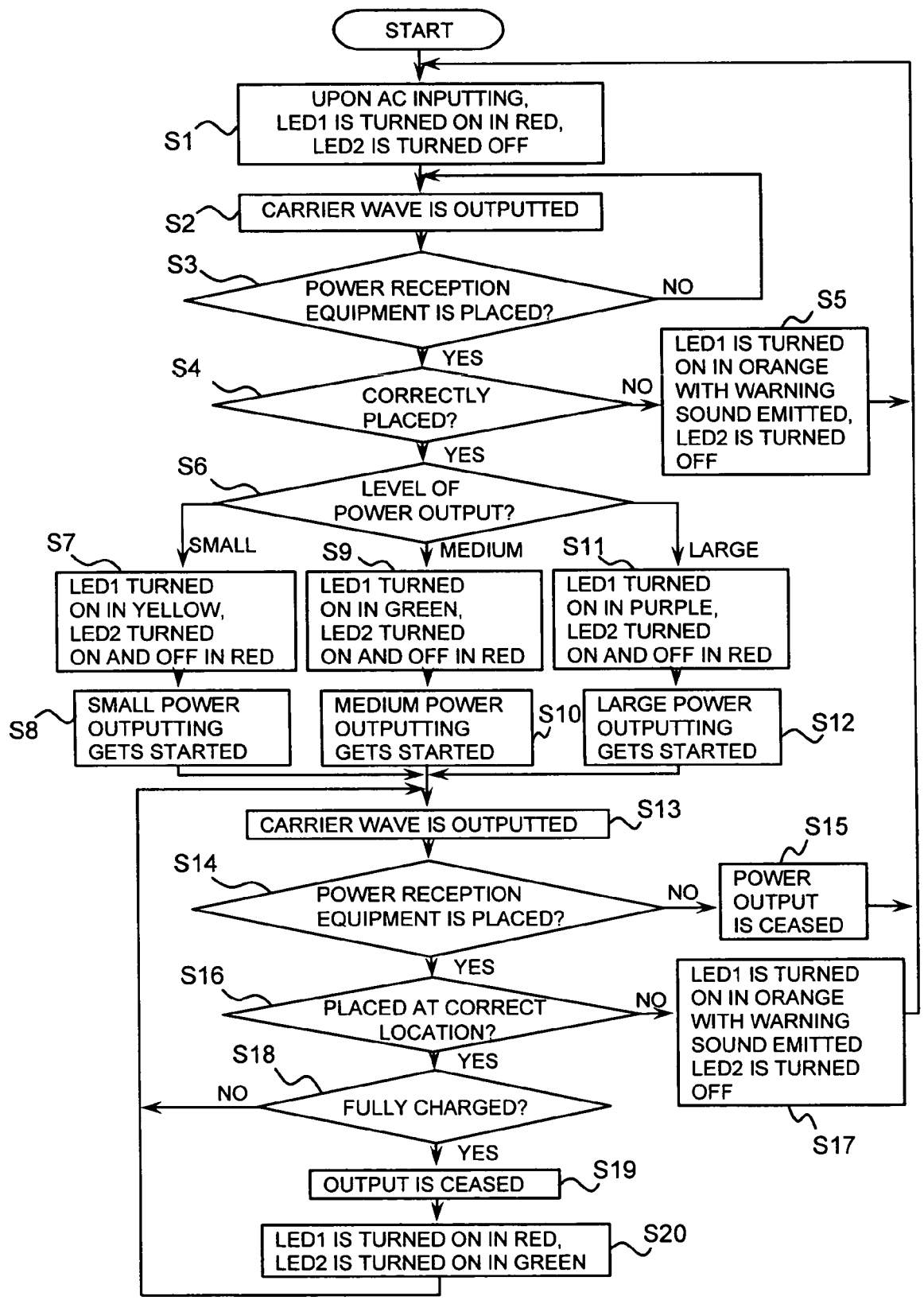
FIG. 4 is a flowchart showing power supply operations in a power transmission apparatus shown in FIG. 3.

Next, description will be given of power supply operations in the power transmission apparatus 1 and the portable telephone 2 having such a configuration with reference to FIG. 4. FIG. 4 is a flowchart showing power supply operations in the power transmission apparatus 1. The power transmission apparatus 1 starts its operation when AC 100 V is supplied thereto. First, when AC 100 V is inputted, the power supply Vcc for control is supplied to the power transmission control IC 24. Then, the LED display circuit 31 turns on the LED 1 in red and turns off the LED2 (step S1). The carrier wave oscillation circuit 37 outputs a predetermined carrier wave at constant intervals (step S2) so that whether or not the power reception equipment is placed on the power transmission apparatus 1 is determined (step S3). Description will be given below of a method for determining whether or not the power reception equipment is placed.

The carrier wave outputted from the carrier wave oscillation circuit 37 is supplied to the tap c of the primary side coil 11, and in a case where the portable telephone 2 is placed on the power transmission apparatus 1, the carrier wave is transmitted to the secondary side coil 12 which is magnetically coupled with the primary side coil 11. The carrier wave transmitted onto the secondary side coil 12 is rectified and smoothed by the rectification circuit 41, the coil 3, and the capacitor C3, and thereby converted to a DC voltage. The power-on reset circuit 44 detects the DC voltage obtained by converting the carrier wave and thereby recognizes that the carrier wave has been transmitted. The clock extraction circuit 43 connected to the secondary side coil 12 extracts a clock signal required for modulation from the carrier wave, and the modulation circuit 45 modulates the carrier wave based on information regarding the portable telephone 2, namely, "code indicating power reception equipment", "information regarding consumed power", and "information regarding full charge" and supplies the modulated wave to the secondary side coil 12. A modulation system adopted at this time is a phase modulation in which a carrier wave is cyclically intensity modulated to express 0/1 information with phase change information of a signal. In such a way, since a clock signal necessary for modulation is extracted from the carrier wave transmitted from the power transmission apparatus 1, no necessity arises for the portable telephone 2, which is power reception equipment, to have an oscillation circuit therein. Furthermore, since power supplied from the carrier wave is used as a driving power for the clock extraction circuit 43 and the modulation circuit 45, no necessity arises for the portable telephone 2, which is power reception equipment, to have a power supply therein, thereby enabling simplification of a circuit to be achieved.

The modulated wave supplied to the secondary side coil 12 from the modulation circuit 45 is transmitted to the primary side coil 11 magnetically coupled thereto. The demodulation circuit 36 connected to the tap c of the primary side coil 11 receives and demodulates the transmitted modulated wave and supplies the "code indicating power reception equipment", "information regarding consumed power", and "information regarding full charge", which are included in the demodulated information signal, to the power transmission enable/disable determination circuit 33, the power amount determination circuit 34, and the full-charge determination circuit 35. Herein, the power transmission enable/disable determination circuit 33 determines whether or not power reception equipment is placed on the power transmission apparatus 1, based on the "code indicating power reception equipment" (step S3). If a predetermined "code indicating power reception equipment" is received, it is determined that power reception equipment is placed on the power transmission apparatus 1 and it is determined whether or not the power reception equipment is correctly placed on the power transmission apparatus 1 (step S4). On the other hand, unless the predetermined "code indicating power reception equipment" is received, it is determined that no power reception equipment is placed on the power transmission apparatus 1, and the carrier wave is outputted again (step S2).

Next, as for determination on whether or not the power reception equipment is correctly placed on the power transmission apparatus 1, the meaning of this phrase is whether or not the coil of the power receiving side and the coil of the power transmission side are arranged at positions where a high power transmission efficiency in a non-contact power supply system is obtained. In other words, whether or not the transmission apparatus 1 and the portable telephone 2 which is power reception equipment, shown in FIG. 2, are arranged at positions where a high coupling degree in magnetic coupling is established between the primary side core 15 of the power transmission apparatus 1 and the secondary side core 16 of the portable telephone 2.

Figure 11A:
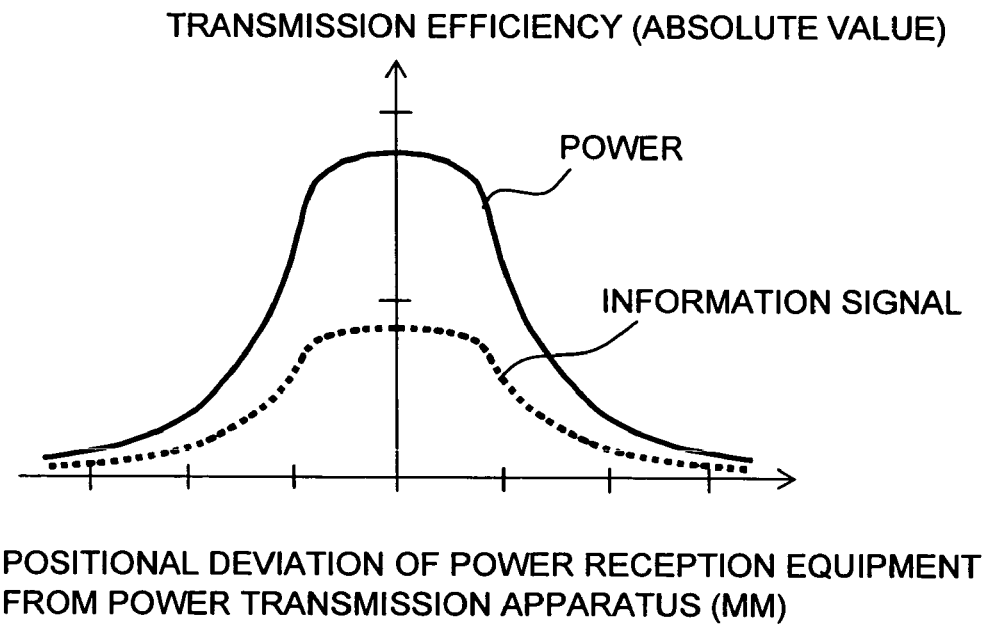
FIG. 11A is a graph showing relationships between a relative position of a portable telephone to a power transmission apparatus and the absolute values of transmission efficiencies of power and an information signal.
Figure 11B:
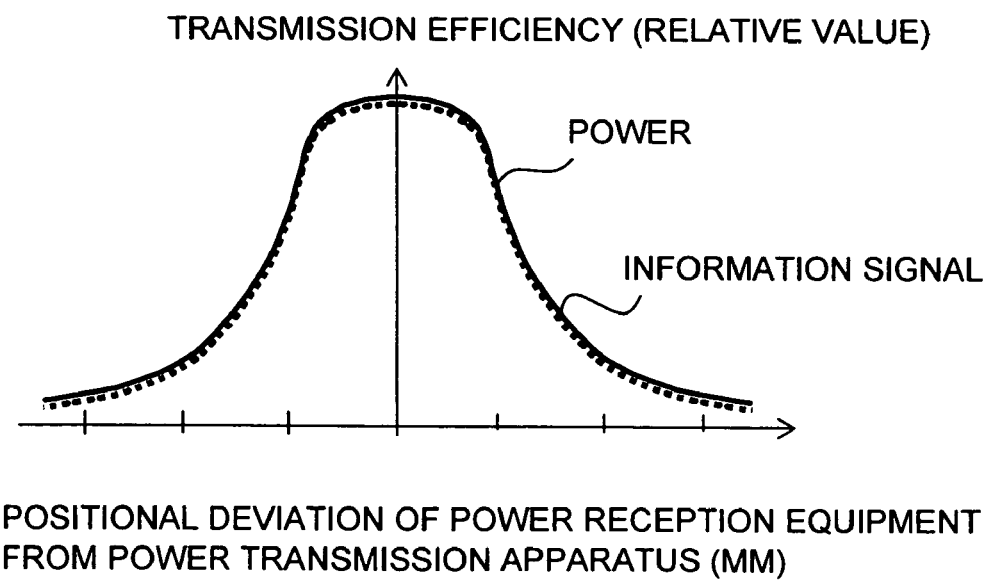
FIG. 11B is a graph showing relationships between a relative position of the portable telephone to the power transmission apparatus and relative values of transmission efficiencies of power and the information signal.

FIGS. 11A and 11B are graphs showing relationships between a relative position of the portable telephone 2 to the power transmission apparatus 1 (a positional deviation of the portable telephone 2 from the power transmission apparatus 1) and a transmission efficiency of power and the information signal. Herein, the term "information signal" means the modulated wave transmitted back from the secondary side circuit 13 in response to a carrier wave transmitted from the primary side circuit 10. FIG. 11A shows the absolute values of the transmission efficiencies of power (in solid line) and the information signal (in broken line). FIG. 11B shows relative values of transmission efficiencies of power (in solid line) and the information signal (in broken line). In either of FIGS. 11A and 11B, the abscissas are assigned to a deviation of the portable telephone 2, which is power reception equipment, from the power transmission apparatus 1. When the power transmission apparatus 1 and the portable telephone 2 are located at positions where the highest coupling degree in magnetic coupling is established between the primary side core 15 of the power transmission apparatus 1 and the secondary side core 16 of the portable telephone 2, the deviation is given 0. Deviations in a left-to-right direction or a forward-to-rearward direction of the portable telephone 2 from the position with the deviation of 0 are measured in units of mm.

As shown in FIG. 11A, the larger the deviation of the portable telephone 2 from the power transmission apparatus 1 becomes, the lower the transmission efficiencies of both power and information signal drop. Since the transmission efficiencies of power and information signal are, as shown in FIG. 11B, reduced at the same rate with an increase in deviation of the portable telephone 2 from the power transmission apparatus 1, a deviation of the portable telephone 2 from the power transmission apparatus 1 can be recognized by measuring a signal intensity of the information signal even in a state where the power transmission apparatus 1 transmits no power.

Since the larger the positional deviation of the portable telephone 2 from the power transmission apparatus 1 becomes, the lower the transmission efficiencies of power and information signal drop, there will be no meaning to transmit the power, because the portable telephone 2 is not capable of receiving it in a case where the power transmission efficiency is extremely low. Therefore, it is determined whether or not the positional deviation of the portable telephone 2 from the power transmission apparatus 1 exceeds a predetermined value (step S4). If it exceeds, no power transmission is performed from the power transmission apparatus 1, and the LED1 is turned on in orange and the LED 2 is turned off as a warning indication (step S5). In this situation, a warning sound may be emitted instead.

On the other hand, if the positional deviation of the portable telephone 2 from the power transmission apparatus 1 does not exceed the predetermined value, the process moves to a process for determining a level of power to be transmitted (step S6). The determination process is performed in the power amount determination circuit 34 based on the "information on consumed power" included in the information signal demodulated in the demodulation circuit 36. The power of the portable telephone 2 is recognized based on the "information on consumed power". A power transmission output is adjusted at one of three levels of large, medium, and small depending on the recognized power. A result of the determination from the power amount determination circuit 34 is transmitted to the LED display circuit 31 and the power change-over circuit 32 so as to perform the process described below in response to one of the large, medium, and small levels as the result of the determination.

If the determination result shows the small level, the LED display circuit 31 turns on the LED1 in yellow and turns on and off the LED2 in red (step S7) so as to indicate that power transmission is performed at the small level. At the same time, the power change-over circuit 32 turns on the transistor TR11. When the transistor TR11 is turned on, a pulse voltage from the switching circuit 22 is applied across the total length of the primary side coil 11 to start power transmission (step S8). Then, when the determination result shows the medium level, the LED display circuit 31 turns on the LED1 in green and turns on and off the LED2 in red (step S9) so as to indicate that power transmission is performed at the medium level. Moreover, the power change-over circuit 32 turns on the transistor TR12. When the transistor TR12 is turned on, a pulse voltage from the switching circuit 22 is applied to the tap a of the primary side coil 11 to start power transmission (step S10). When the determination result shows the large level, the LED display circuit 31 turns on the LED1 in purple and turns on and off the LED2 in red (step S11) so as to indicate that power transmission is performed at the large level. Moreover, the power change-over circuit 32 turns on the transistor TR13. When the transistor TR13 is turned on, a pulse voltage from the switching circuit 22 is applied to the tap b of the primary side coil 11 to start power transmission (step S12).

By selecting one from among the transistors TR11, TR12, and TR13, a location of the winding of the primary side coil 11 at which a pulse voltage from the switching circuit is applied changes. That is, since an actual effective number of turns of the primary side coil changes, a turns ratio of the primary side coil 11 to the secondary side coil 12 changes. In such a way, power in accordance with the power required by the power reception equipment can be transmitted. Note that, although the present embodiment shows that the power transmission output is selected from among the three levels, large, medium, and small, the number of levels may be increased.

Even after the power transmission is started, the carrier wave is regularly transmitted (step S13), and it is checked whether or not the portable telephone 2, which is power reception equipment, has been removed from the power transmission apparatus 1 according to the information included in the modulated wave transmitted back in response to the carrier wave (step S14). In the confirmation, the power transmission enable/disable determination circuit 33 determines, in a similar manner to that in step S3, whether or not the power reception equipment is placed on the power transmission apparatus 1, based on the "code indicating power reception equipment". If a predetermined "code indicating power reception equipment" has not been received, it is determined that the power reception equipment has been removed from the power transmission apparatus 1, and the power change-over circuit 32 turns off all of the transistors TR11, TR12, and TR13 to cease power transmission (step S15).

On the other hand, if the predetermined "code indicating power reception equipment" has been received, it is recognized that the power reception equipment has been placed on the power transmission apparatus 1, and then, it is determined whether or not the power reception equipment has been placed correctly on the power transmission apparatus 1 (step S16). The determination is performed in a similar manner to that in step S4 by determining whether or not a deviation of the portable telephone 2 from the power transmission apparatus 1 exceeds a predetermined value. If the positional deviation exceeds the predetermined value, no power transmission is performed from the power transmission apparatus 1. Then, in a similar manner to that in step 5, the LED1 is turned on in orange and the LED2 is turned off as a warning indication (step S17). In this situation, a warning sound may be emitted instead.

On the other hand, if the positional deviation of the portable telephone 2 from the power transmission apparatus 1 does not exceed the predetermined value, then the process moves to a process in which it is determined whether or not the portable telephone 2 has been fully charged (step S18). The determination process is performed in a way such that the full-charge determination circuit 35 determines whether or not the portable telephone 2 is in a state of full charge, based on the "information on full charge" included in the information signal demodulated in the demodulation circuit 36. If the information shows a state of full charge, the power change-over circuit 32 turns off all of the transistors TR11, TR12, and TR13 to cease power output (step S19), and the LED1 is turned on in red and the LED2 is turned on in green (step S20) so as to indicate that the power transmission ceases, because the power reception equipment is in a full charge sate. Thereafter, the carrier wave is outputted to thereby continue confirmation of a state of the power reception equipment (step S13). On the other hand, if the information does not show a state of full charge, the confirmation of a state of the power reception equipment continues while performing power transmission (step S13). In this way as described above, a non-contact power supply is performed from the power transmission 1 to the portable telephone 2.

While description has been given of the case where operation states and others of the power transmission apparatus 1 (presence or absence of power transmission, transmission power level, and fully charged or not) are represented by display colors and states of lighting (turning off, turning on, and turning on and off) of the LEDs, description will be given of display behaviors of the LED1 and LED2 below with reference to FIG. 12. FIG. 12 is a table showing display states of the LEDs corresponding to operating states of the power transmission apparatus 1. First, when the AC plug 1a is not connected to the commercial power supply (AC 100 V), the LED1 is turned off and the LED2 is turned off. When the AC plug 1a is connected to AC 100 V, the LED1 is turned on in red and the LED2 is turned off. Depending on the level of the power being transmitted among the large, medium, and small levels, based on the information of the power reception equipment, the LED1 is turned on in purple and the LED2 is turned on and off in red for the large level; the LED1 is turned on in green and the LED2 is turned on and off in red for the medium level; and the LED1 is turned on in yellow and the LED2 is turned on and off in red for the small level. In a case where the power reception equipment is being charged or in a state of full charge, the LED1 is turned on and off in red during charging; and the LED2 is turned on in green in the state of full charge. In a case where the power reception equipment has been placed on the power transmission apparatus 1 with a positional deviation of the predetermined value or more, the LED1 can be turned on in orange together with a warning sound emission. With such display states adopted, a user can visually judge the operating state of the power transmission apparatus. Note that locations of the LEDs and combinations of colors, turning on, turning on and off, turning off, and the like of the LEDs are exemplified above, on which no specific limitation is placed.

Figure 5:
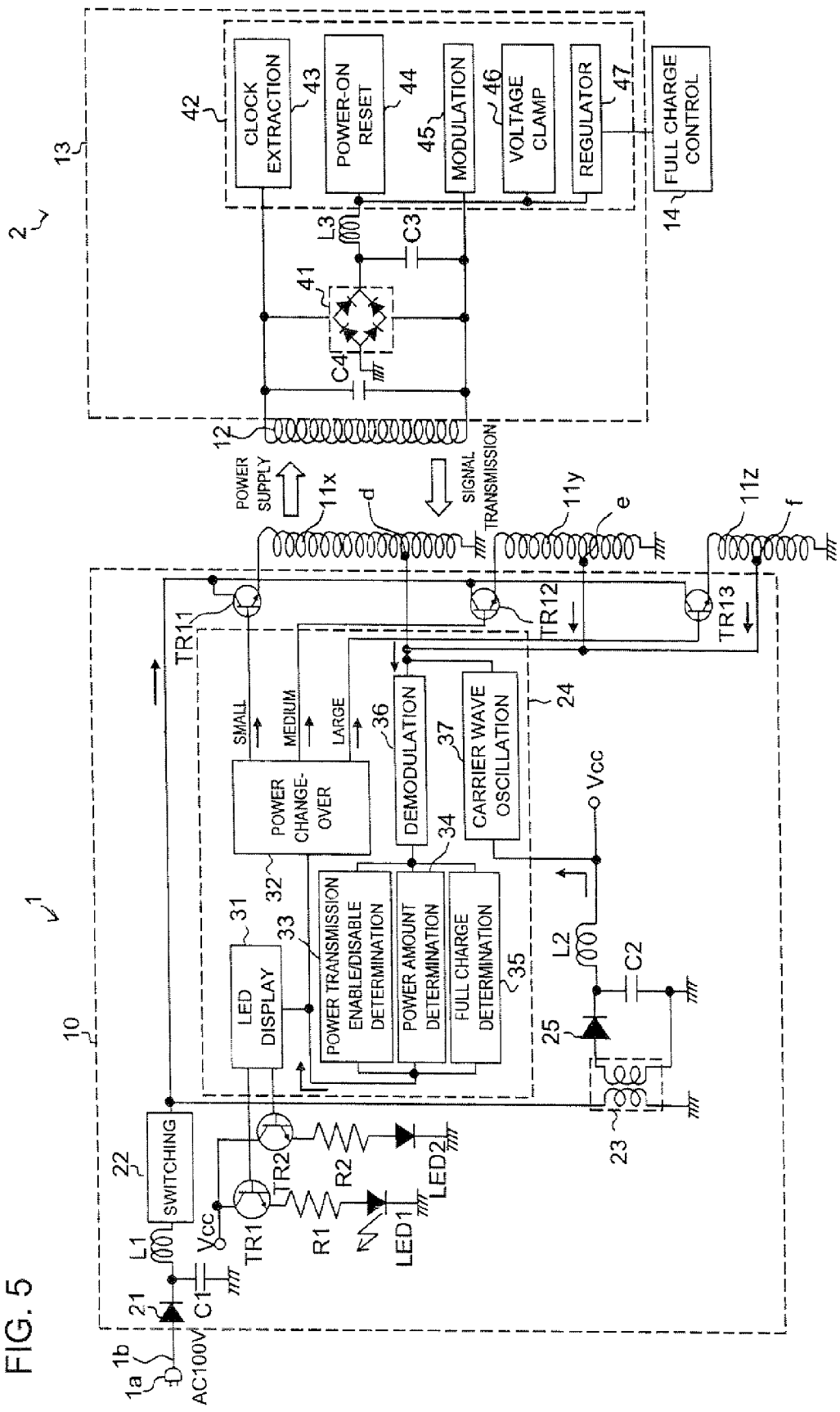
FIG. 5 is a block diagram showing an electric configuration of a power supply system of a example second embodiment.

FIG. 5 is a block diagram showing an electric configuration of a power supply system of a second example embodiment. In FIG. 5, the same constituents as in FIG. 3 are attached with the same symbols and descriptions thereof will not be given herein. The power supply system shown in FIG. 5 is different from the power supply system shown in FIG. 3 in that a primary side coils 11x, 11y, and 11z are provided instead of the primary side coil 11 of the power transmission apparatus 1. The three primary side coils are attached with the symbols 11x, 11y, and 11z in the descending order of the number of turns thereof, and one end thereof are all grounded. Other end of the primary side coil 11x is connected to the emitter of the transistor TR11; other end of the primary side coil 11y is connected to the emitter of the transistor TR12; and other end of the primary side coil 11z is connected to the emitter of the transistor TR13. The coils are provided with a tap d (on the primary side coil 11x), a tap e (on the primary side coil 11y), and a tap f (on the primary side coil 11z) respectively, at points where the number of turns are the same from the grounded ends of the coils. The taps d, e, and f are all connected to the demodulation circuit 36 and the carrier wave oscillation circuit 37. Note that, although the primary side coils 11x, 11y, and 11z are illustrated apart from one another in FIG. 5, the primary side coils are actually disposed very close to one another. Therefore, the secondary side coil 12 can be disposed in close proximity to any of the three primary side coils.

In this embodiment, the power transmission apparatus 1 has the configuration in which three coils for power transmission and respective transistors are provided. It is also possible to transmit power in the same manner as in the case of the power transmission apparatus 1 shown in FIG. 3 where one primary side coil 11 is used. In this embodiment, to be specific, one of the transistors is selected by the power change-over circuit 32 according to the level of power to be transmitted determined from the signal containing the "information on consumed power" received from the portable telephone 2. Accordingly, a coil for transmitting power can be selected, and power required for the power reception equipment can be transmitted. For example, in a case where the power of the power reception equipment is small, a coil with a large number of turns is used. In a case where the power of the power reception equipment is large, a coil with a small number of turns is used.

Figure 6:
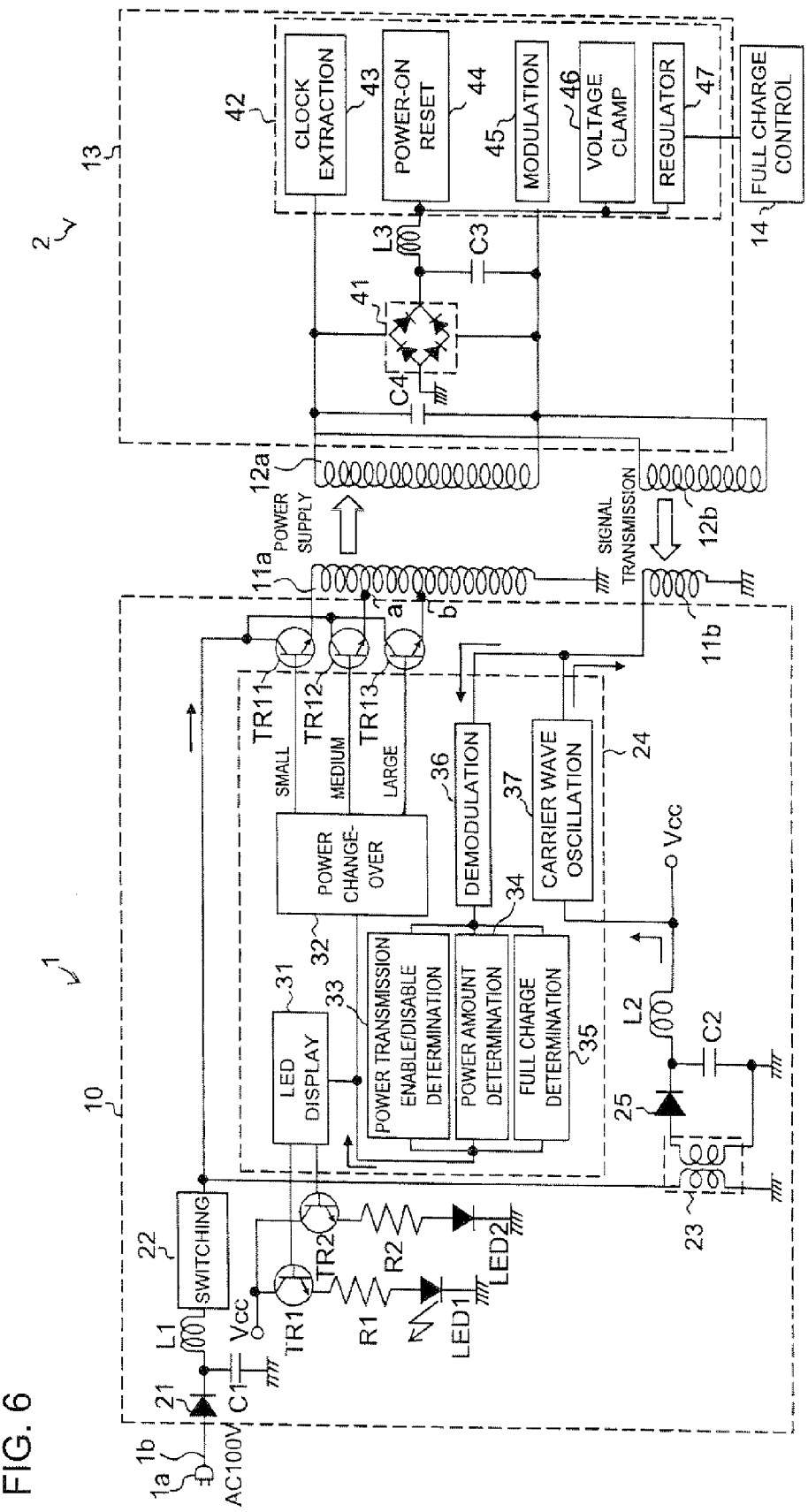
FIG. 6 is a block diagram showing an electric configuration of a power supply system of a third example embodiment.

While in the embodiments shown in FIGS. 3 and 5, transmission of the information signal between the power transmission apparatus 1 and the portable telephone 2 is performed using the same coil as in the power supply, the power supply coil and the signal transmission coil may be separated from each other as shown in FIG. 6.

FIG. 6 is a block diagram showing an electric configuration of a power supply system of a third example embodiment. In FIG. 6, the same constituents as in FIG. 3 are attached with the same symbols and descriptions thereof will not be given herein. The power supply system shown in FIG. 6 is different from the power supply system shown in FIG. 3 in that primary side coils 11a and 11b are provided instead of the primary side coil 11 of the power transmission apparatus 1, and secondary side coils 12a and 12b are provided instead of the secondary side coil 12 of the portable telephone 2.

In the power transmission apparatus 1 shown in FIG. 3, the demodulation circuit 36 and the carrier wave oscillation circuit 37 are connected to the tap c of the primary side coil 11. However, in the power transmission apparatus 1 shown in FIG. 6, the demodulation circuit 36 and the carrier wave oscillation circuit 37 are connected to one end of the primary side coil 11b, and the other end of the primary side coil 11b is grounded. Therefore, the primary side coil 11a serves as a coil dedicated to the power transmission, and the primary side coil 11b serves as a coil dedicated to the signal transmission. Furthermore, the secondary side coils 12a and 12b are connected in parallel instead of a single secondary side coil 12 of the portable telephone 2 shown in FIG. 3. The secondary side coil 12a serves as a coil dedicated to the power transmission, and the secondary side coil 12b serves as a coil dedicated to the signal transmission. With such a configuration in which the power transmission coil and the signal transmission coil are separated from each other, it is also possible to transmit power required for the power reception equipment in a similar manner to the case where the power and the signal are transmitted through one primary side coil 11 and one secondary side coil 12 as in the power transmission apparatus 1 shown in FIG. 3. In a case where the signal transmission coil and the power transmission coil are electrically separated from each other as are in the case of the primary side coils 11a and 11b, it is possible to reduce a withstand voltage required of electronic components or the like used in control circuits such as the demodulation circuit 36 to which the signal is transmitted.

Figure 7:
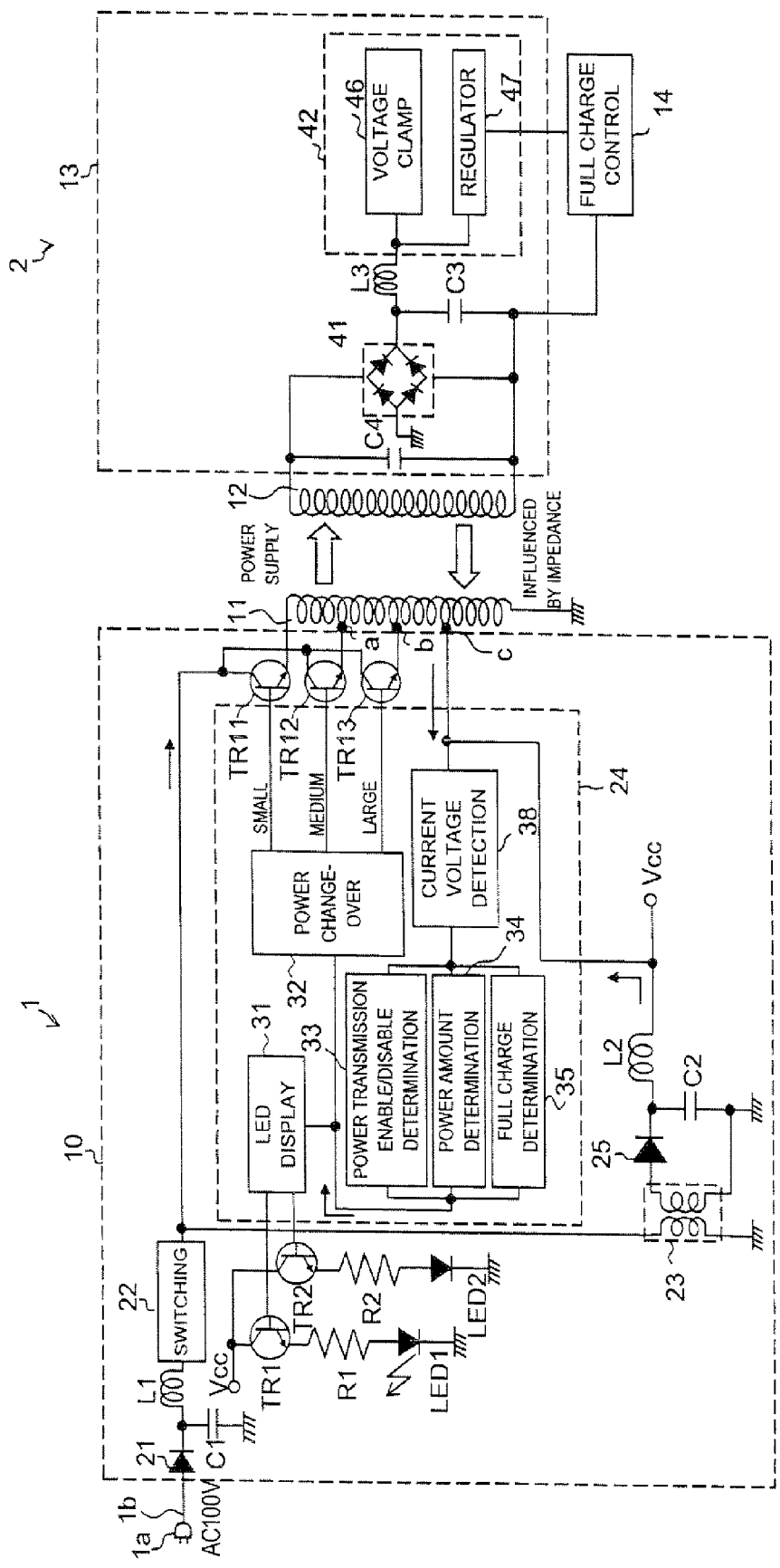
FIG. 7 is a block diagram showing an electric configuration of a power supply system of a fourth example embodiment.

FIG. 7 is a block diagram showing an electric configuration of a power supply system of a fourth example embodiment. In FIG. 7, the same constituents as in FIG. 3 are attached with the same symbols and descriptions thereof will not be given herein. The power supply system shown in FIG. 7 is different from the power supply system shown in FIG. 3 in that the carrier wave oscillation circuit 37 in the primary side circuit 10 of the power transmission apparatus 1 is removed, and a current voltage detection circuit 38 detecting a change in current flowing in and/or voltage appearing across the primary side coil 11 is provided instead of the demodulation circuit 36. The clock extraction circuit 43, the power-on reset circuit 44, and the demodulation circuit 45 of the secondary side circuit 13 of the portable telephone 2 are removed.

In performing power supply from the power transmission apparatus 1 to the portable telephone 2 as described above, it is necessary to recognize the three types of information. The first one is to recognize whether or not power reception equipment is placed on the power transmission apparatus 1. The second one is to recognize power required for the power reception equipment. The third one is to recognize whether or not the power reception equipment has been fully charged. As for the first one, since the current flowing in and/or the voltage appearing across the primary side coil 11 changes depending on whether or not the equipment placed on the power transmission apparatus 1 can receive power, the presence or the absence of the equipment can be recognized by a change in the current and/or the voltage.

For example, in a case where the power transmission apparatus 1 turns on one of the transistors TR1, TR2, and TR3, and performs power transmission, the current flowing in and/or the voltage appearing across the primary side coil 11 detected by the current voltage detection circuit 38 changes when an item that can not receive power such as a piece of metal is placed on the power transmission apparatus 1. However, such a change in current and/or voltage is different from the change in current and/or voltage that occurs when different pieces of equipment that can receive power are placed on the power transmission apparatus 1. A pattern of the change is measured in advance, that pattern is compared with the actually measured pattern, and thereby the power transmission enable/disable determination circuit 33 determines whether or not an item placed is a piece of metal or equipment that can receive power. In a case where the power transmission enable/disable determination circuit 33 determines that no item that can receive power is placed, the power change over circuit 22 is controlled so that the transistors TR11, TR12, and TR13 are all turned off to thereby enable power transmission to be ceased. Such a configuration serves to enhance safety, because a piece of metal or the like does not produce heat when placed on the power transmission apparatus 1.

On the other hand, in a case where equipment that can receive power, for example the portable telephone 2, is placed, a change is observed in the current flowing in and/or the voltage appearing across the primary side coil 11 detected by the current voltage detection circuit 38, because the portable telephone 2 has a proper impedance. A pattern of the change is measured in advance, and that pattern is compared with the actually detected pattern, and thereby the power transmission enable/disable determination circuit 33 determines whether or not an item placed is power reception equipment. If the power transmission enable/disable circuit 33 determines that equipment that can receive power is placed, the power change-over circuit 32 is changed over, wherein one of the transistors TR1, TR2, and TR3 is selectively turned on to thereby enable power transmission to be performed.

Next, as for the second recognition, since the number of turns of the coil used in the power reception equipment is different depending on a difference in power of the power reception equipment, the current flowing in and/or the voltage appearing across the primary side coil 11 changes depending on a difference in power of the placed power reception equipment. Hence, it is possible to recognize the information regarding power required by the power reception equipment placed on the power transmission apparatus 1. For example, in a case where power transmission gets started by turning on one of the transistors TR1, TR2, and TR3, at that time, one of a large change, a medium change, and a small change occurs in the current flowing in and/or the voltage appearing across the primary side coil 11 detected by the current voltage detection circuit 38. Then, the power amount determination circuit 34 determines whether power of the portable telephone 2 is large power, medium power, or small power. Accordingly, the power change over circuit 32 is controlled to select one of large, medium, and small levels. In such a way, power of the portable telephone 2 is recognized to thereby enable a power level to be transmitted to be adjusted.

Next, as for the third recognition, with progress in charging of the power reception equipment, current flowing in the power reception equipment decreases. In this situation, since current flowing in the primary side coil 11 also decreases, a change in current flowing in the primary side coil 11 is detected to thereby enable whether or not the power reception equipment reaches a fully charged condition (charging has been completed or not) to be recognized. For example, while one of the transistors TR1, TR2, and TR3 is turned on, and thereby power transmission is performed, the full-charge determination circuit 35 determines whether or not the portable telephone 2 has been fully charged based on the change in the current flowing in the primary side coil 11 detected by the current voltage detection circuit 38. If a fully charged condition is determined, the power change-over circuit 32 is controlled so that the transistors TR11, TR12, and TR13 are all turned off to enable power transmission to be ceased.

In this way, power depending on the power requirement of the power reception equipment can be transmitted only when the power reception equipment that can receive power is placed on the power transmission apparatus 1. When the placed power reception equipment has been fully charged, power transmission can be ceased. With this arrangement, it is not necessary to transmit an information signal between the power transmission apparatus 1 and the portable telephone 2, thereby enabling a power supply system to be simplified.

Figure 8:
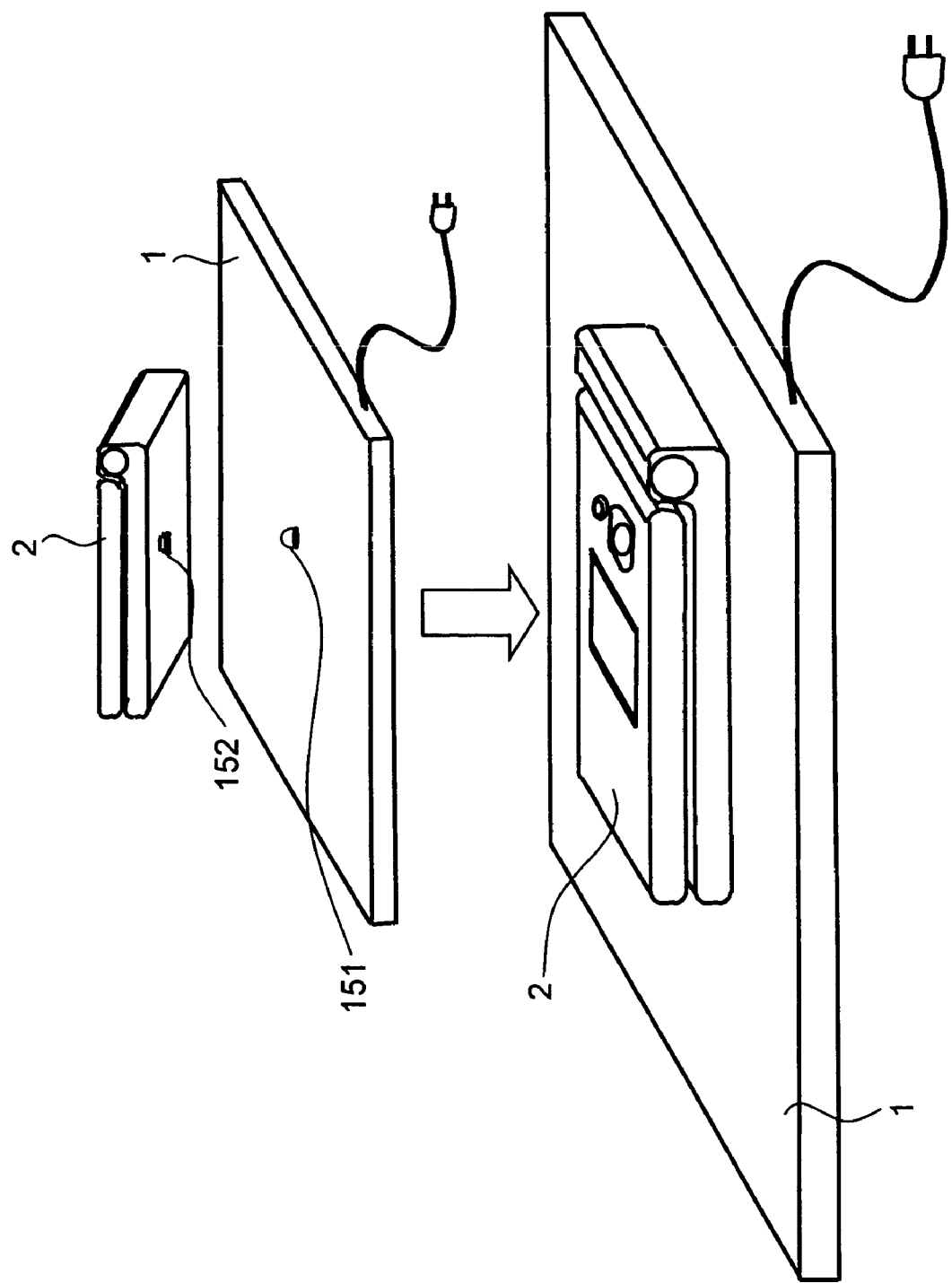
FIG. 8 is a view showing an outer appearance of a power supply system of a fifth example embodiment.

FIG. 8 is a view showing an outer appearance of a power supply system of a fifth example embodiment. In FIG. 8, the same constituents as in FIG. 1A are attached with the same symbols and descriptions thereof will not be given herein. In FIG. 8, there are shown a state where the power transmission apparatus 1 and the portable telephone 2 are separated away from each other and a state where the portable telephone 2 is placed on the power transmission apparatus 1. A protrusion 151 is, as shown in FIG. 8, formed on the power transmission apparatus 1, while a depression 152 is formed on the portable telephone 2. The protrusion 151 and the depression 152 are engaged with each other to thereby enable positioning of the power transmission apparatus 1 and the portable telephone 2 to be established. Moreover, though not shown, a depression 152 in absolutely the identical shape as found on the portable telephone 2 can be formed on different types of power reception equipment such as notebook PCs, digital cameras, PDAs, or the like, thereby enabling positioning of each type of equipment with the power transmission apparatus 1 to be established. With this structure, a single power transmission apparatus 1 can be commonly used for many types of power reception equipment.

Figure 9:
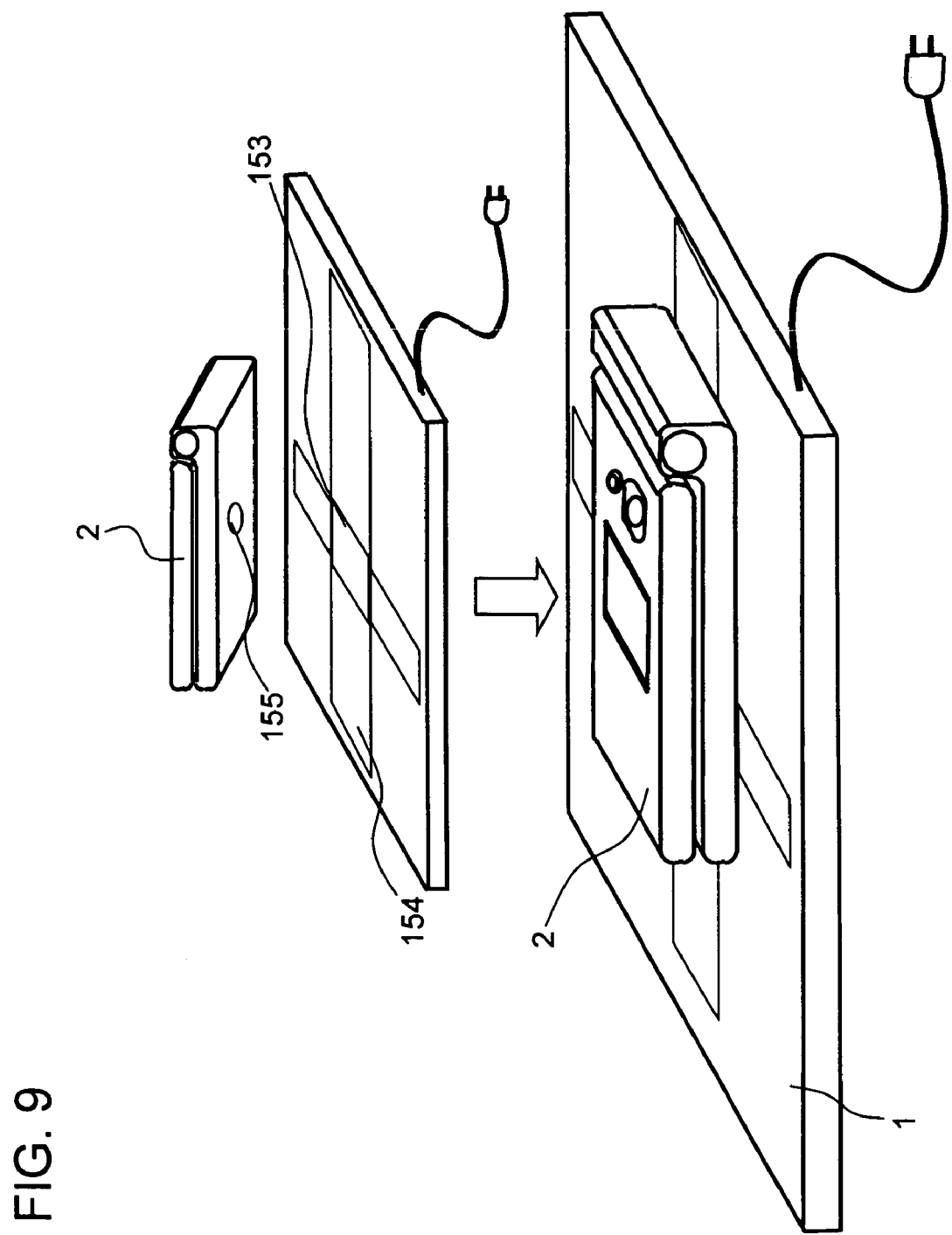
FIG. 9 is a view showing an outer appearance of a power supply system of a sixth example embodiment.

FIG. 9 is a view showing an outer appearance of a power supply system of a sixth example embodiment. In FIG. 9, the same constituents as in FIG. 8 are attached with the same symbols and descriptions thereof will not be given herein. In FIG. 9, there are shown a state where the power transmission apparatus 1 and the portable telephone 2 are separated away from each other and a state where the portable telephone 2 is placed on the power transmission apparatus 1. A mark 153 indicating a chargeable region and an auxiliary mark (cross-shaped mark) 154 for positioning are provided on the power transmission apparatus 1, and a mark 155 for positioning is provided on the portable telephone 2. The portable telephone 2 is placed on the power transmission apparatus 1 so that the mark 155 of the portable telephone 2 is included in the chargeable region thereof. In other words, the mark 155 and the mark 153 are superimposed on each other to thereby enable the portable telephone 2 to be charged. Moreover, though not shown, the mark 155 in absolutely the identical shape as found on the portable telephone 2 can be formed on different power reception equipment such as notebook PCs, digital cameras PDAs, or the like, thereby enabling positioning of each type of equipment with the power transmission apparatus 1 to be established. With this structure, a single power transmission apparatus 1 can be commonly used for many types of power reception equipment. In such a positioning with marks, it is not necessary to form the protrusion and the depression as provided in the embodiment shown in FIG. 8, thereby enabling the power transmission apparatus 1 and the portable telephone 2 to assume a low profile shape.

FIGS. 10A and 10B are block diagrams showing internal constructions of a power supply system of a seventh example embodiment. In FIG. 10A, there is shown a state where a conventional portable telephone 101 is placed on the power transmission apparatus 1, and in FIG. 10B, there is shown a state where the portable telephone 2 is placed on the power transmission apparatus 1. In FIGS. 10A and 10B, the same constituents as in FIG. 2A are attached with the same symbols and descriptions thereof will not be given herein.

The power transmission apparatus 1 shown in FIGS. 10A and 10B is different from the power transmission apparatus 1 shown in FIG. 1 in that power transmission electrodes 117a and 117b for supplying power in a contact manner, an inter-electrode current detection circuit 118 for monitoring current flowing between the power transmission electrodes 117a and 117b, and a power route change-over circuit 119 are added so as to be used for the conventional portable telephone 101 as well so that charging can be also performed with power supplied through power receiving electrodes 101a and 101b that are kept in contact.

The inter-electrode current detection circuit 118 monitors current flowing between the power transmission electrodes 117a and 117b, and if the conventional portable telephone 101 of a contact charge type, as shown in FIG. 10A, is placed on the power transmission apparatus 1 and the power receiving electrodes 101a and 101b for charging are brought into contact with the respective power transmission electrodes 117a and 117b, current flows between the power transmission electrodes 117a and 117b, and thereby the presence of the portable telephone 101 is recognized. In a case where the contact charge type portable telephone 101 is recognized, power is supplied only to the side of the power transmission electrodes 117a and 117b by the power route change-over circuit 119. On the other hand, in a case where a non-contact charge type portable telephone 2 is, as shown in FIG. 10B, placed, power is supplied only to the primary side coil 11 by the power route change-over circuit 119 to thereby perform power supply according to a method similar to that in the embodiments that have been described so far. In such a way, a single power transmission apparatus 1 can supply power to both the portable telephones of the contact and non-contact types. Though not shown, a charger for digital cameras, PDAs, or the like can be operated in a similar way by both the contact type and the non-contact type.

Figure 13E:
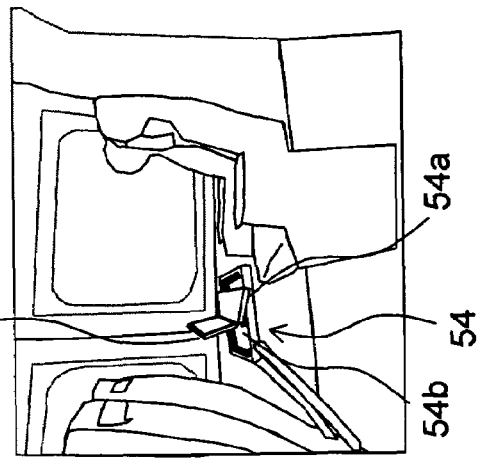
FIG. 13E is a view showing an outer appearance of another example of the power supply system of the eighth example embodiment.
Figure 13B:
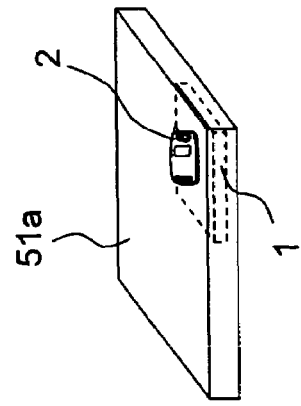
FIG. 13B is an enlarged view showing an outer appearance of a part of the power supply system shown in FIG. 13A.
Figure 13D:
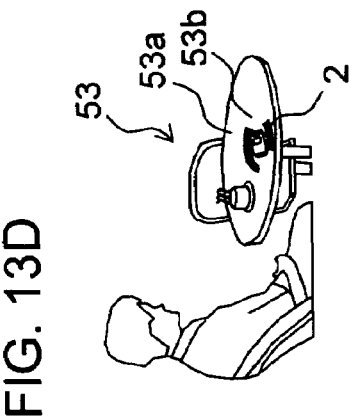
FIG. 13D is a view showing an outer appearance of another example of the power supply system of the eighth example embodiment.
Figure 13A:
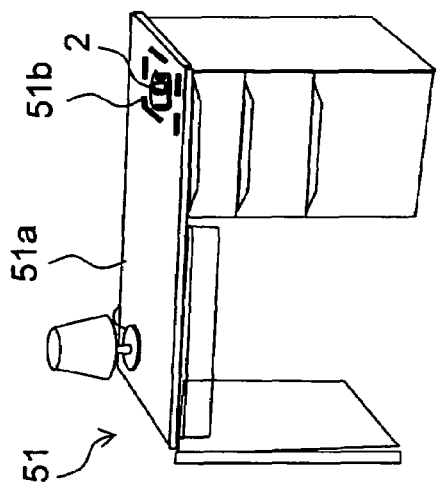
FIG. 13A is a view showing an outer appearance of an example power supply system of an eighth example embodiment.

FIGS. 13A to 13E are views showing outer appearances of power supply systems of an eighth example embodiment. The power supply systems shown in FIGS. 13A to 13E are characterized by that the power transmission apparatus 1 shown in one of FIGS. 1A, 1B, 2A, 2B, 3, 5 to 9, 10A, and 10B is embedded in a top plate of a desk (utensil), of which some examples are shown. In FIG. 13A, there is shown an outer appearance of a study desk 51 placed in a study room or the like and having a top plate 51a in which a power transmission apparatus 1 is embedded. In FIG. 13B, there is shown a partial enlarged view of a portion 51b, in which the power transmission apparatus 1 is embedded, of the top plate 51a. The power transmission apparatus 1 is embedded inside of the top plate 51a so as not to protrude from the surface of the top plate 51a.

Figure 13C:
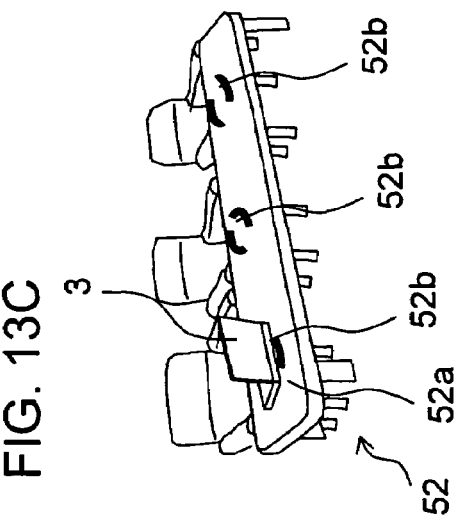
FIG. 13C is a view showing an outer appearance of another example of the power supply system of the eighth example embodiment.

In FIG. 13C, there is shown an outer appearance of a conference desk placed in a conference room or the like and having a top plate 52a in which power transmission apparatuses 1 are embedded. In FIG. 13C, a numerical symbol 52b indicates portions where the power transmission apparatuses 1 are embedded. The power transmission apparatuses 1 are embedded in the same manner as in FIG. 13B. In FIG. 13D, there is shown an outer appearance of a dining table 53 placed in an eating house or the like and having a top plate 53a in which a power transmission apparatus 1 is embedded. In FIG. 13D, a numerical symbol 53b indicates a portion where the power transmission apparatus 1 is embedded. The power transmission apparatus 1 is embedded in the same manner as in FIG. 13B. In FIG. 13E, there is shown an outer appearance of a table 54 provided in a train and having a top plate 54a in which a power transmission apparatus 1 is embedded. In FIG. 13E, a numerical symbol 54b indicates a portion where the power transmission apparatus 1 is embedded. The power transmission apparatus 1 is embedded in the same manner as in FIG. 13B. Note that, although an AC plug and a cord for supplying the commercial power supply (AC 100 V) to the embedded power transmission apparatus or apparatuses 1 are not shown, the commercial power supply is fed to the embedded power transmission apparatus or apparatuses 1 through a power supply cord or the like embedded in the interiors of the desk or the table and the top plate thereof shown in FIGS. 13A to 13E.

In FIGS. 13A to 13E, a numerical symbol 2 indicates the portable telephone shown in one of FIGS. 1A, 2A, 2B, 3, 5 to 9 and 10B. A numerical symbol 3 indicates the notebook PC shown in FIG. 1B. The power transmission apparatus 1 is embedded in the top plate of each of the various kinds of desks or tables. When the portable telephone 2 or the notebook PC 3 is placed at the portion where the power transmission apparatus 1 is embedded, the amount of power required for the portable telephone 2 or the notebook PC 3 thus placed is detected as described above, and thereby, power to be transmitted is adjusted and supplied. This means that, a single power transmission apparatus 1 can supply power to any of various kinds of power reception equipment placed on a desk in which said one transmission apparatus 1 is embedded. By embedding the power transmission apparatus in the top plate of a desk, not only is a space which an AC adapter and a charger occupy unnecessary, but a power supply cord for supplying a commercial power will not be an obstacle either, leading to an advantage enabling effective use of a space on a desk.

In a case where the power transmission apparatus 1 is, as shown in FIG. 13E, embedded in a table in an automobile in traveling or, as shown in FIGS. 13C and 13D, embedded in a table in a facility at a destination (a shop or a conference room), no necessity arises for an AC adapter and a charger dedicated to equipment to be carried with a user, and the equipment can be charged anywhere the user wishes, thereby enabling the equipment to be used without worrying about the remaining battery power. Since the power transmission apparatus 1 can charge various types of equipment, the power transmission apparatus 1 can charge any equipment having a battery such as PDAs, digital cameras, camcorders, or the like in a similar manner without specifically limiting the use thereof to a portable telephone and a notebook PC. Note that, in addition to the examples shown in the figures, the power transmission apparatus or apparatuses 1 can be embedded in tables of vehicles such as an airplane and a ship, a learning desk, a desk installed at a place where a wireless LAN communication is possible, and desks provided in hotel rooms in a similar manner.

Figure 14:
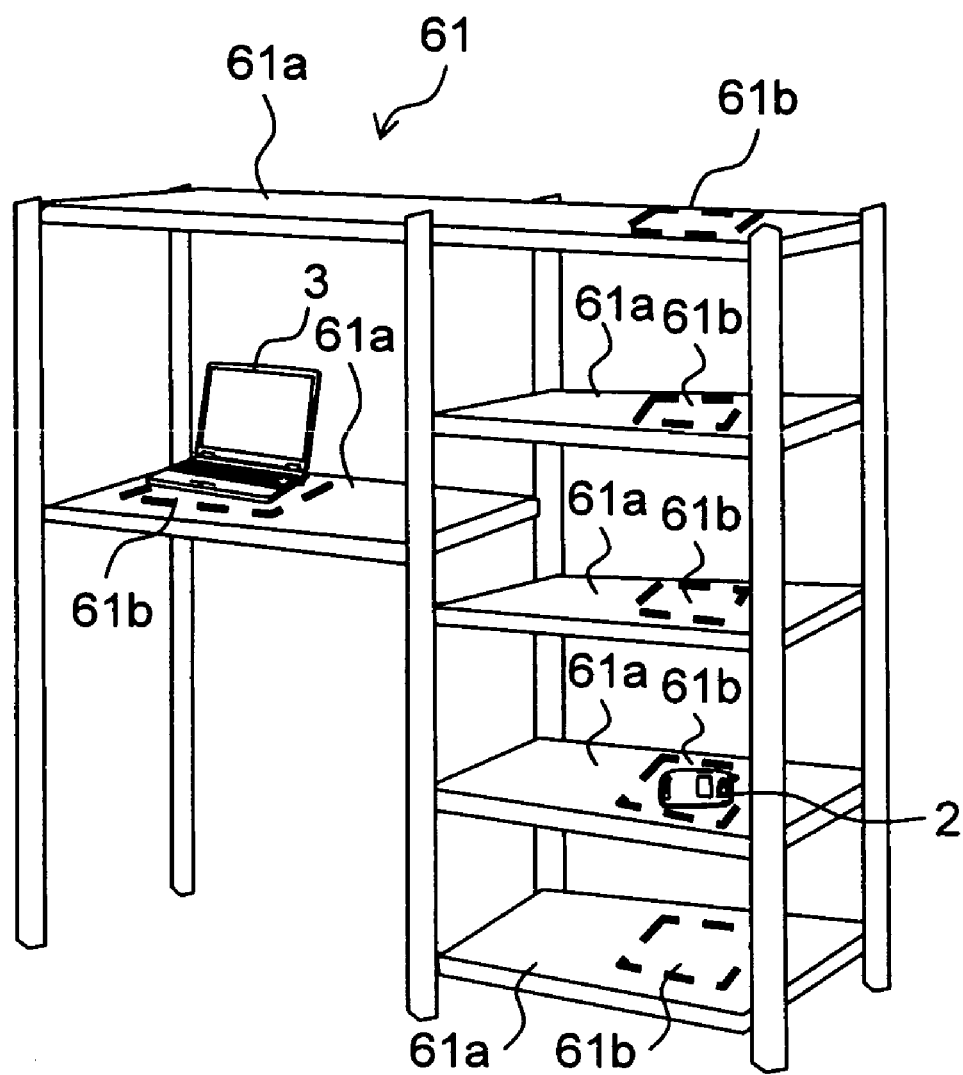
FIG. 14 is a view showing an outer appearance of an example of a power supply system of a ninth example embodiment.

FIG. 14 is a view showing an outer appearance of a power supply system of a ninth example embodiment. A power supply system shown in FIG. 14 is characterized by that the power transmission apparatuses 1 shown in one of FIGS. 1A, 2A, 2B, 3, 5 to 9, 10A, and 10B are embedded in shelves (utensils) and an example thereof is shown. In FIG. 14, a numerical symbol 61 indicates a rack. A numerical symbol 61a indicates a plurality of shelves arranged in the rack 61 and having the embedded power transmission apparatuses 1 (not shown). A numerical symbol 61b indicates portions 61a at the shelves where the power transmission apparatuses 1 (not shown) are embedded. The power transmission apparatuses 1 are embedded in a similar manner to that shown in FIG. 13B. Note that, although an AC plug and a cord for feeding a commercial power supply (AC 100 V) to the power transmission apparatuses 1 embedded are not shown, the commercial power supply is fed to the embedded power transmission apparatuses 1 through a power supply cord or the like embedded in the interior of the rack 61 and the shelves 61a shown in FIG. 14.

In FIG. 14, a numerical symbol 2 indicates the portable telephone shown in one of FIGS. 1A, 2A, 2B, 3, 5 to 9, and 10B, and a numerical symbol 3 indicates the notebook PC 3 shown in FIG. 1B. The power transmission apparatus 1 embedded in the shelf 61a, when the portable telephone 2 or the notebook PC 3 is placed at a portion 61b where the power transmission apparatus 1 is embedded, detects power necessary for the portable telephone 2 or the notebook PC 3 placed in a manner described above, and adjusts and supplies the power thereto. That is, a single power transmission apparatus 1 can supply power to any of various types of power reception equipment placed on the shelf 61a in which said power transmission apparatus 1 is embedded. As described, when the power transmission apparatuses 1 are embedded in shelves 61a, space to accommodate AC adapters and chargers become unnecessary. It is also possible to reduce the number of power supply cords because a plurality of power transmission apparatuses 1 can share a common single power supply cord which extends to the rack 61 from an AC socket provided on a wall surface of a room or the like from which a commercial power supply is provided. In a case where no power transmission apparatus 1 is used, all of the space corresponding thereto can be available for storage. Since the power transmission apparatuses 1 are installed in a plurality of shelves 61a, the equipment can be easily relocated. Charging can be performed on any types of portable telephones or notebook PCs regardless of their models or makes, and can also be performed on other types of equipment such as digital cameras and portable game machines.

Figure 15B:
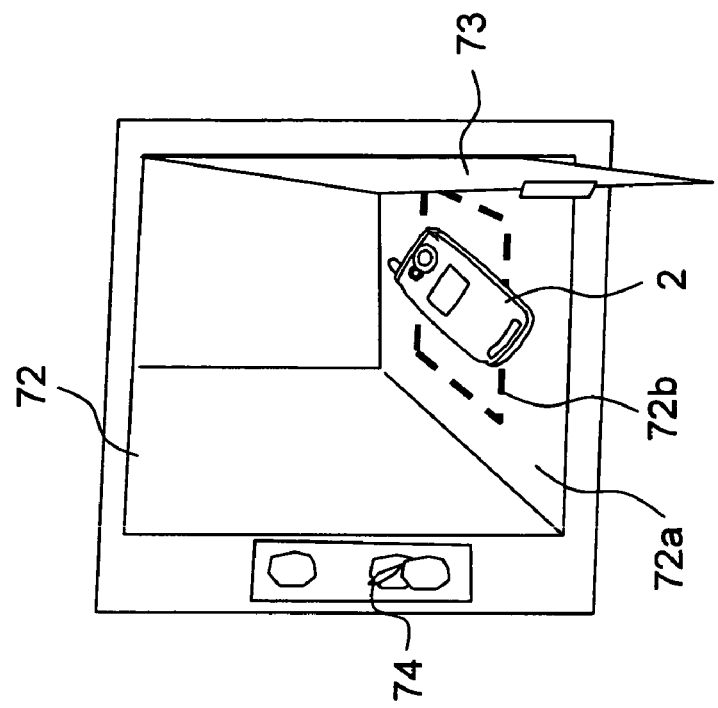
FIG. 15B is an enlarged view showing an outer appearance of a part of the power supply system shown in FIG. 15A.
Figure 15A:
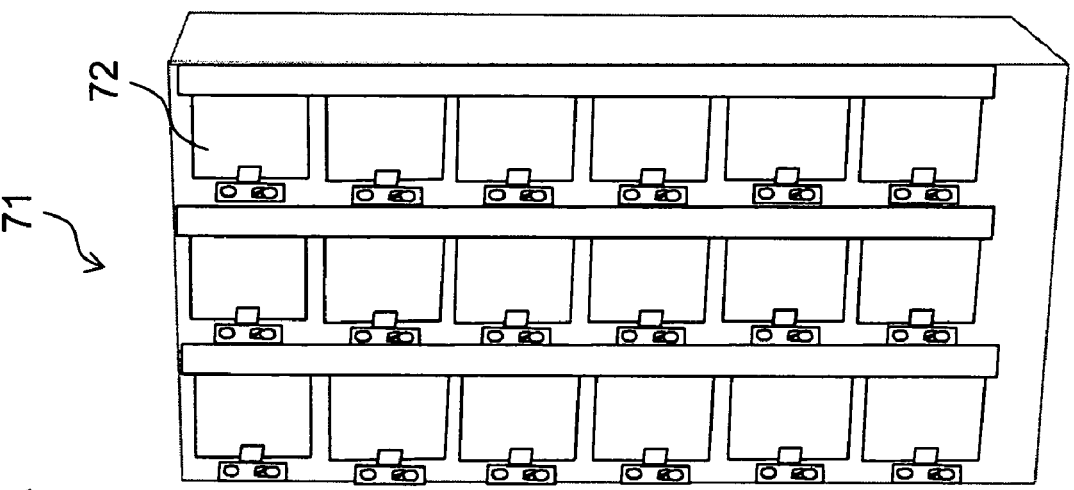
FIG. 15A is a view showing an outer appearance of a power supply system of a tenth example embodiment.

FIGS. 15A and 15B are views showing an outer appearance of a power supply system of a tenth example embodiment. The power supply system shown in FIGS. 15A and 15B is characterized by that the power transmission apparatus 1 shown in one of FIGS. 1A, 2A, 2B, 3, 5 to 9, 10A, and 10B is embedded in a bottom plate (utensil) forming a storage compartment. In FIGS. 15A and 15B, there is shown an example. In FIGS. 15A and 15B, a numerical symbol 71 indicates a locker. A numerical symbol 72 indicates a plurality of storage compartments provided in the locker 71. FIG. 15A shows an entire outer appearance of the locker 71, and FIG. 15B shows one of the storage compartments 72 in an enlarged view. The storage compartment 72 is of a construction in which, as shown in FIG. 15B, a door 73 and a lock 74 are provided and, thereby, is lockable. The power transmission apparatus 1 (not shown) is embedded in a bottom plate 72a constituting the storage compartment 72. In FIG. 15B, a numerical symbol 72b indicates a portion of the bottom plate 72a at which the power transmission apparatus 1 is embedded. The power transmission apparatus 1 is embedded in a similar manner to that in FIG. 13B. Note that, although an AC plug and a cord for feeding a commercial power supply (AC 100 V) to the embedded power transmission apparatus 1 is not shown, the commercial power supply is fed to the embedded power transmission apparatus 1 through a power supply cord or the like embedded in the interior of the locker 71 and the interior of the bottom plate 72a.

In FIG. 15B, a numerical symbol 2 is the portable telephone shown in one of FIGS. 1A, 2A, 2B, 3, 5 to 9, and 10B. The power transmission apparatus 1 embedded in the bottom plate 72a, when the portable telephone 2 is placed at the portion 72b where the power transmission apparatus 1 is embedded, as described above, detects power necessary for the portable telephone 2 placed thereon to thereby adjust and supply the power. That is, a single power transmission apparatus 1 can supply power to any of various types of power reception equipment placed on the bottom plates 72a in which the power transmission apparatus 1 is embedded. Since the storage compartment 72 can be locked, no necessity arises for a user to wait in a public area even when the portable telephone 2 placed in the storage compartment 72 is charged there, which is convenient. Furthermore, there is also another advantage of less chance of the power transmission apparatus 1 being stolen or broken even in a public area. Charging can be performed on any type of portable telephone 2 regardless of model and make, and can also be performed on other types of equipment such as notebook PCs, digital cameras, and portable game machines.

Figure 16:
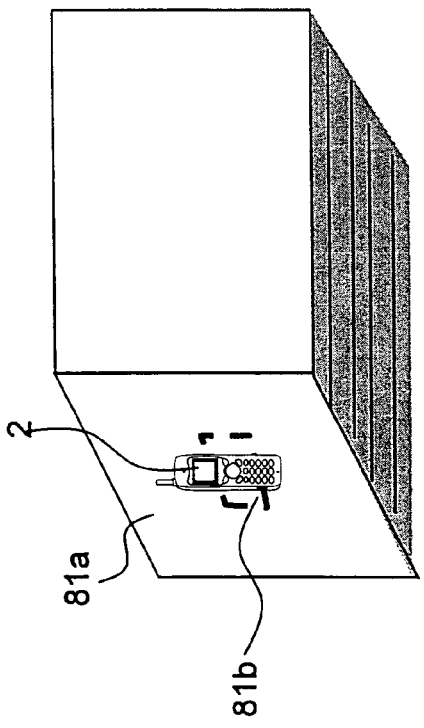
FIG. 16 is a view showing an outer appearance of a power supply system of an eleventh example embodiment.

FIG. 16 is a view showing an outer appearance of a power supply system of an eleventh example embodiment. The power supply system shown in FIG. 16 is characterized by that the power transmission apparatus 1 shown in one of FIGS. 1A, 2A, 2B, 3, 5 to 9, 10A, and 10B is embedded in a wall of a room or the like. In FIG. 16, there is shown an example. In FIG. 16, an alphanumeric symbol 81a indicates a wall, and an alphanumeric symbol 81b indicates a portion on the wall where a power transmission apparatus 1 (not shown) is embedded. The power transmission apparatus 1 (not shown) is embedded in a similar manner to that shown in FIG. 13B. A structure (not shown) for hooking the equipment is provided at a portion 81b where the power transmission apparatus 1 is embedded, and the portable telephone 2 shown in one of FIGS. 1A, 2A, 2B, 3, 5 to 9, and 10B is hooked there. Note that, although an AC plug and a cord for feeding a commercial power supply (AC 100V) to the embedded power transmission apparatus 1 are not shown, the commercial power supply is fed to the embedded power transmission apparatus 1 through a power supply cord or the like embedded inside the wall 81a.

Charging can be started when the portable telephone 2 is, as shown in FIG. 16, hooked at the portion 81b where the power supply apparatus 1 is embedded. At that time, the power transmission apparatus 1 embedded in the wall 81a, as described above, detects power necessary for the portable telephone 2 hooked at the portion 81b where the power transmission apparatus 1 is embedded to adjust and supply the power. That is, a single power transmission apparatus 1 can supply power to any of various types of power reception equipment hooked at the wall where the power transmission apparatus 1 is embedded. Since the power transmission apparatus 1 is embedded in the wall, neither a cord to be routed on the surface thereof nor space on the floor for placing the portable telephone 2 is required. Note that, in the embodiment, although the power transmission apparatus 1 is embedded in the wall 81a, the power transmission apparatus 1 can be embedded in a side surface of furniture and utensils such as a refrigerator, a cabinet, and a shelf, in which cases, a similar effect can be obtained. Charging can be performed on any types of portable telephone 2 regardless of their models and makes, and can also be performed on other types of equipment such as notebook PCs, digital cameras, and portable game machines.

Figure 17:
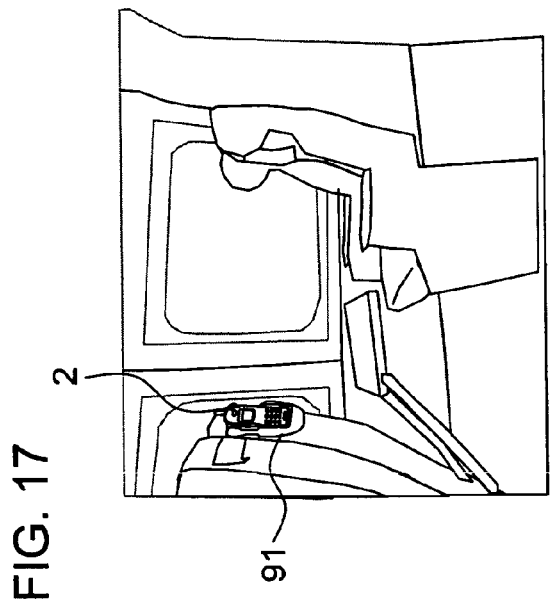
FIG. 17 is a view showing an outer appearance of a power supply system of a twelfth example embodiment.

FIG. 17 is a view showing an outer appearance of a power supply system of a twelfth example embodiment. The power supply system shown in FIG. 17 is characterized by that the power transmission apparatus 1 shown in one of FIGS. 1A, 2A, 2B, 3, 5 to 9, 10A, and 10B is embedded in a holder (utensil). In FIG. 17, there is shown an example. In FIG. 17, a numerical symbol 91 indicates a holder for holding the portable telephone 2 shown in one of FIGS. 1A, 2A, 2B, 3, 5 to 9, and 10B, and the holder is fixed to the rear side of a seat of train. The power transmission apparatus 1 is embedded in the holder 91 in a similar manner to that shown in FIG. 13B. Note that, although an AC plug and a cord for feeding a commercial power supply (AC 100 V) to the embedded power supply apparatus 1 are not shown, the commercial power supply is fed to the embedded power transmission apparatus 1 through a power supply cord or the like embedded inside the holder 91.

When a portable telephone 2 is, as shown in FIG. 17, held by the holder 91, charging starts. The power transmission apparatus 1 embedded in the holder 91, as described above, detects power necessary for the portable telephone 2 so as to adjust and supply the power. That is, a single power transmission apparatus 1 can supply power to any of various types of power reception equipment held by the holder 91 in which the power transmission apparatus 1 is embedded. Since the power transmission apparatus 1 is of a holder type, a positional deviation is hard to occur during traveling so as to enable stable charging. By using and charging the portable telephone 2 alternately, there arises an advantage that the portable telephone 2 can be used for longer time without paying attention to the remaining battery power even in a train in running. Since the power transmission apparatus 1 is embedded, a chance of the power transmission apparatus 1 being taken away even from a public site without permission becomes smaller. Charging can be performed on any types of portable telephone 2 regardless of their models and makes, and can also be performed on other types of equipment such as notebook PCs, digital cameras, and portable game machines.

Figure 18:
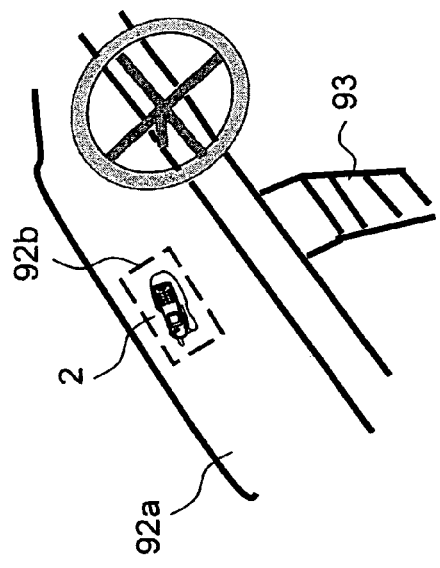
FIG. 18 is a view showing an outer appearance of a power supply system of a thirteenth example embodiment.

FIG. 18 is a view showing an outer appearance of a power supply system of a thirteenth example embodiment. The power supply system shown in FIG. 18 is characterized by that the power transmission apparatus 1 shown in one of FIGS. 1A, 2A, 2B, 3, 5 to 9, 10A, and 10B is embedded in a dashboard (utensil) of an automobile. In FIG. 18, there is shown an example. Note that, the embedded power transmission apparatus 1 not only operates by obtaining power supply through a power supply cord provided in the interior of the dashboard or the like from a battery of the automobile, but power from the battery is also supplied to power reception equipment. In FIG. 18, an alphanumeric symbol 92a indicates a dashboard, and an alphanumeric symbol 92b indicates a portion of the dashboard 92a where the power transmission apparatus 1 (not shown) is embedded. The power transmission apparatus 1 is embedded in a similar manner to that shown in FIG. 13B.

In FIG. 18, a numerical symbol 2 indicates the portable telephone shown in one of FIGS. 1A, 2A, 2B, 3, 5 to 9, and 10B. The power transmission apparatus 1 embedded in the dashboard 92a, when the portable telephone 2 is placed on the portion 92b where the power transmission apparatus 1 is embedded, as described above, detects power necessary for the portable telephone 2 placed thereon to adjust and supply the power. That is, a single power transmission apparatus 1 can supply power to any of various types of power reception equipment placed on the dashboard 92a where the power transmission apparatus 1 is embedded. Since the power transmission apparatus 1 is embedded in the dashboard 92a, there is nothing to block a view field of a driver in the absence of a charging adapter or a cord, which would otherwise block the view, thereby contributing to safety in driving. By using and charging the portable telephone 2 alternately, there arises an advantage that the portable telephone 2 can be used longer time without paying attention to the remaining battery power even in an automobile during running. Charging can be performed on any types of portable telephone 2 regardless of their models and makes, and can also be performed on other types of equipment such as notebook PCs, digital cameras, and portable game machines. Even in a case where the power transmission apparatus 1 is embedded in a console box 93 (utensil) of an automobile shown in FIG. 18, a similar effect can be attained.

Figure 19:
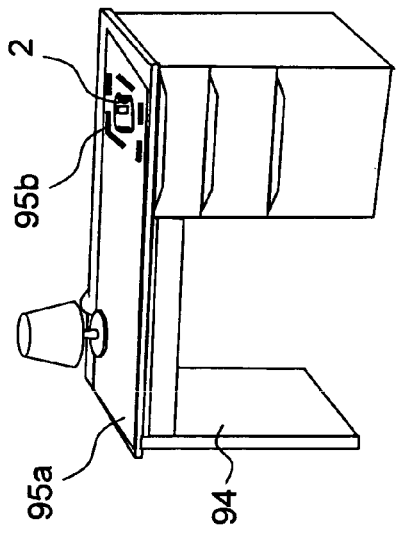
FIG. 19 is a view showing an outer appearance of a power supply system of a fourteenth example embodiment.

FIG. 19 is a view showing an outer appearance of a power supply system of a fourteenth example embodiment. The power supply system shown in FIG. 19 is characterized by that the power transmission apparatus 1 shown in one of FIGS. 1A, 2A, 2B, 3, 5 to 9, 10A, and 10B is embedded in a top mat (utensil). In FIG. 19, there is shown an example. In FIG. 19, a numerical symbol 94 indicates a desk and a numerical symbol 95a indicates a top mat, made of resin or glass in which a power transmission apparatus 1 is embedded, placed on the desk 94. A numerical symbol 95b indicates a portion of the top mat 95a where the power transmission apparatus 1 is embedded. The power transmission apparatus 1 is embedded in a similar manner to that shown in FIG. 13B. Note that, although an AC plug and a cord for feeding a commercial power supply (AC 100 V) to the embedded power transmission apparatus 1 are not shown, the commercial power supply is fed to the embedded power transmission apparatus 1 through a power supply cord or the like embedded in the top mat 95a.

In FIG. 19, a numerical symbol 2 indicates the portable telephone shown in one of FIGS. 1A, 2A, 2B, 3, 5 to 9, and 10B. The power transmission apparatus 1 embedded in the top mat 95a, when the portable telephone 2 is placed at the portion 95b where the power transmission apparatus 1 is embedded, as described above, detects power necessary for the portable telephone placed to adjust and supply the power. That is, a single power transmission apparatus 1 can supply power to any of various types of power reception equipment placed on the top mat 95a in which the power transmission apparatus 1 is embedded. Since the power transmission apparatus 1 is embedded in the top mat 95a, the entire top mat 95a can be used when no charging is performed. Note that, in the embodiment, although the power transmission apparatus 1 is embedded in the top mat 95a placed on the desk 94, the power transmission apparatus 1 can be embedded in a top mat placed on a dining table (table top mat), a closet, a piano, or the like, or other pieces of furniture or utensils in a similar manner, in which cases a similar effect can be attained. Charging can be performed on any types of portable telephone regardless of their models and makes, and can be also performed on other types of equipment such as notebook PCs, digital cameras, and portable game machines.

Figure 20:
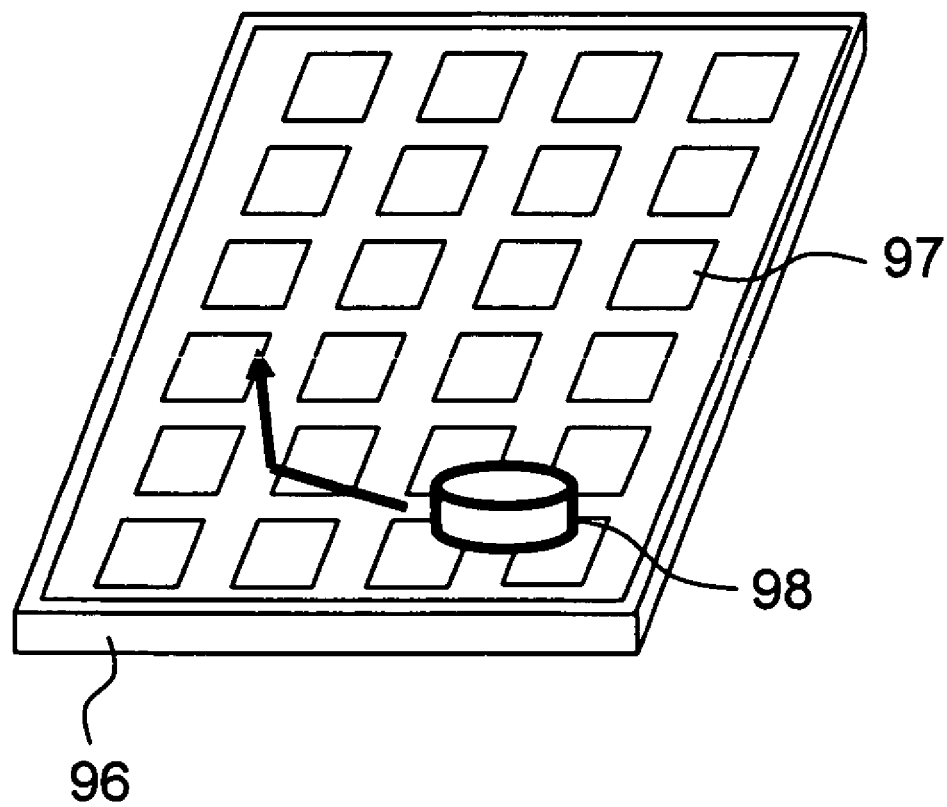
FIG. 20 is a view showing an outer appearance of a power supply system of a fifteenth example embodiment.

FIG. 20 is a view showing an outer appearance of a power supply system of a fifteenth example embodiment. The power supply system shown in FIG. 20 is characterized that the power transmission apparatus 1 shown in one of FIGS. 1A, 2A, 2B, 3, 5 to 9, 10A, and 10B is embedded in a floor. In FIG. 20, there is shown an example. In FIG. 20, a numerical symbol 96 indicates a floor and a numerical symbol 97 indicates a portion of the floor 96 where the power transmission apparatus 1 (not shown) is embedded. A plurality of power transmission apparatuses 1 are embedded in a similar manner to that shown in FIG. 13B. Note that, although an AC plug and a cord for feeding a commercial power supply (AC 100 V) to the embedded power transmission apparatuses 1 are not shown, the commercial power supply is fed to the power transmission apparatuses 1 through a power supply cord or the like embedded in the floor 96.

A numerical symbol 98 indicates a cleaning robot that cleans the floor. The cleaning robot 98 is power reception equipment having a power adjusting section corresponding to the power transmission apparatus 1 as in the case of the portable telephone 2 shown in one of FIGS. 1A, 2A, 2B, 3, 5 to 9, and 10B. The power transmission apparatus 1, when the cleaning robot 98 moves onto the portion 97 where the power transmission apparatus 1 is embedded, as described above, detects power necessary for the cleaning robot 98 so as to adjust and supply the power. Since, in this way, the cleaning robot 98 can be charged while it is in motion, the cleaning robot 98 can continue to run for a long time. Since the power transmission apparatuses 1 are embedded in the floor 96, no surface irregularity occurs on the floor 96 so that the cleaning robot 98 can move smoothly. Charging can be performed on any types of cleaning robot 98 regardless of their models and makes, and can be also performed on other types of equipment such as notebook PCs, digital cameras, and portable game machines. Although, in the embodiment, the power transmission apparatuses 1 are embedded in the floor 96, the power transmission apparatuses 1 can be embedded in floor covering fabrics, such as a rug, a carpet, or a tatami mat, in which cases a similar effect can be attained.

Figure 21:
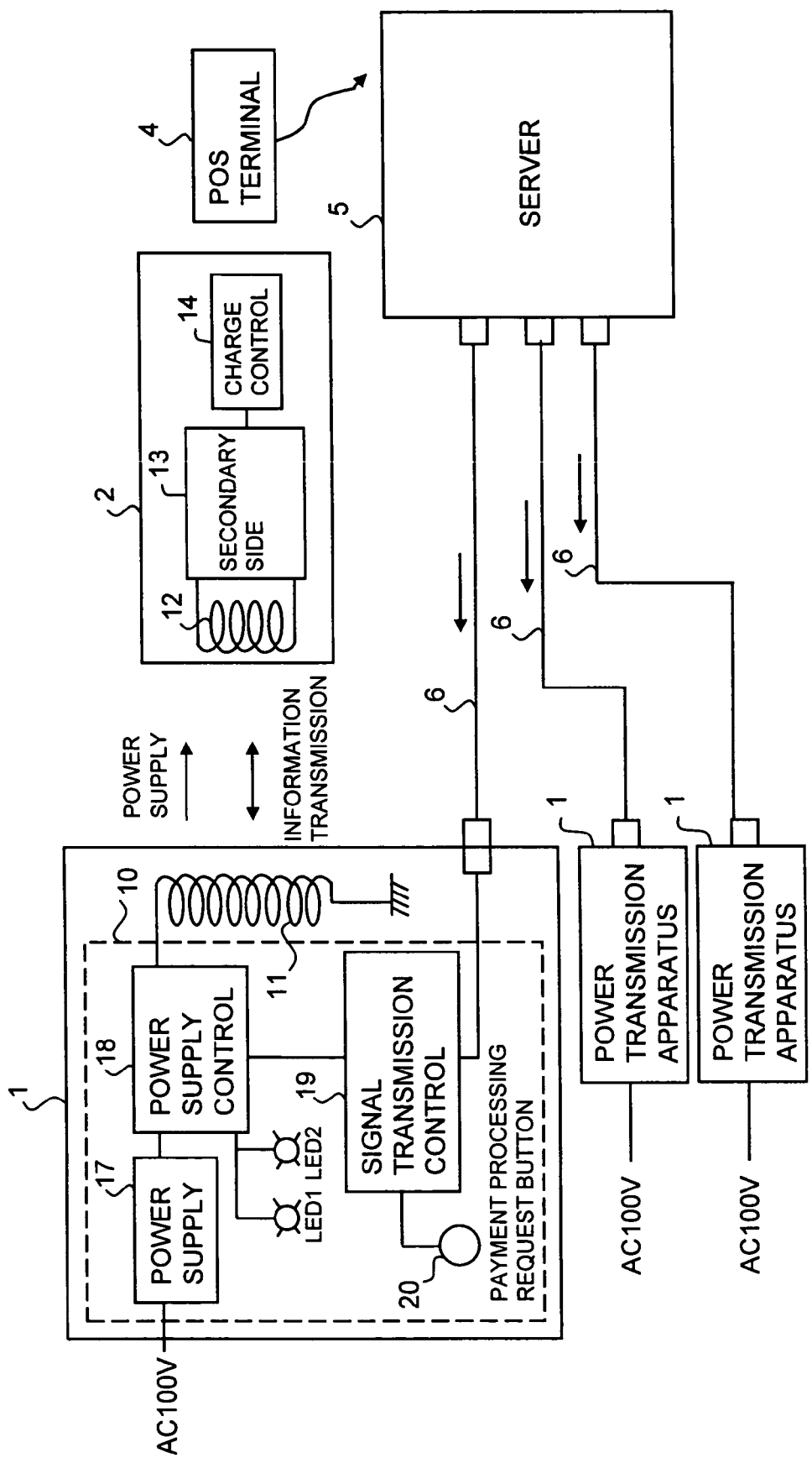
FIG. 21 is a block diagram showing an electric configuration of a power supply system of a sixteenth example embodiment.

FIG. 21 is a block diagram showing an electric configuration of a power supply system of a sixteenth example embodiment. For convenience's sake in the description, the same constituents as in the power supply system shown in FIG. 3 are attached with the same symbols. In FIG. 21, a numerical symbol 1 indicates a power transmission apparatus. The power transmission apparatuses 1 are embedded in the top plates (not shown) of a plurality of tables provided in a shop such as an eating house. A numerical symbol 2 indicates a portable telephone which is power reception equipment and placed on the top plate of the table in which the power transmission apparatus 1 is embedded.

The power transmission apparatus 1 is fed with a commercial power supply (AC 100 V) from a socket or the like provided on a wall surface of the shop, and the AC 100 V thus supplied is fed to a primary side circuit 10. The AC 100 V is rectified and smoothed by a power supply circuit 17 in the primary side circuit 10 and converted to a DC voltage. The DC voltage is subjected to switching by a power supply control circuit (power adjusting section) 18 and converted into a pulse voltage. The pulse voltage is supplied to the primary side coil 11, and thereby, power is supplied to the portable telephone 2 by the non-contact transmission method through a secondary side circuit 13 provided the portable telephone 2. Charging is performed on the portable telephone 2 with the help of a secondary side circuit 13 and a charge control circuit 14.

Furthermore, by the non-contact transmission method, not only power but also various information signals are transmitted or received between the power transmission apparatus 1 and the portable telephone 2. The power transmission apparatus 1 recognizes power of the portable telephone 2 based on the information signal transmitted from the portable telephone 2 placed on the power transmission apparatus 1 and has a function of supplying power necessary for the portable telephone 2. Therefore, a single power transmission apparatus 1 can charge, without specifically limiting to the portable telephone 2, any types of other electronic equipment having different power requirements for charging.

The power transmission apparatus 1 is, as shown in FIG. 21, connected to a server (external apparatus) 5 of a shop through a network 6 provided therein, and guest order information or the like is transmitted to the server 5 from POS terminals 4 carried by shop persons. Note that the network 6 may be wireless. When a payment processing request button 20 of the power transmission apparatus 1 is pushed down, a payment information signal used in a process of paying for eating and drinking charges incurred by a guest in the shop at a table in which a power transmission apparatus 1 having the payment processing request button which is pushed by the guest is embedded, prices of goods purchased in a store by a guest, and/or for charges of service received from a shop by a guest is transmitted or received between the server 5 and the portable telephone 2 through the power transmission apparatus 1 by means of a signal transmission control circuit 19 of the power transmission apparatus 1. The payment can be performed by a mobile banking function of the portable telephone 2 based on the payment information signal transmitted or received between the server 5 and the portable telephone 2.

Figure 22:
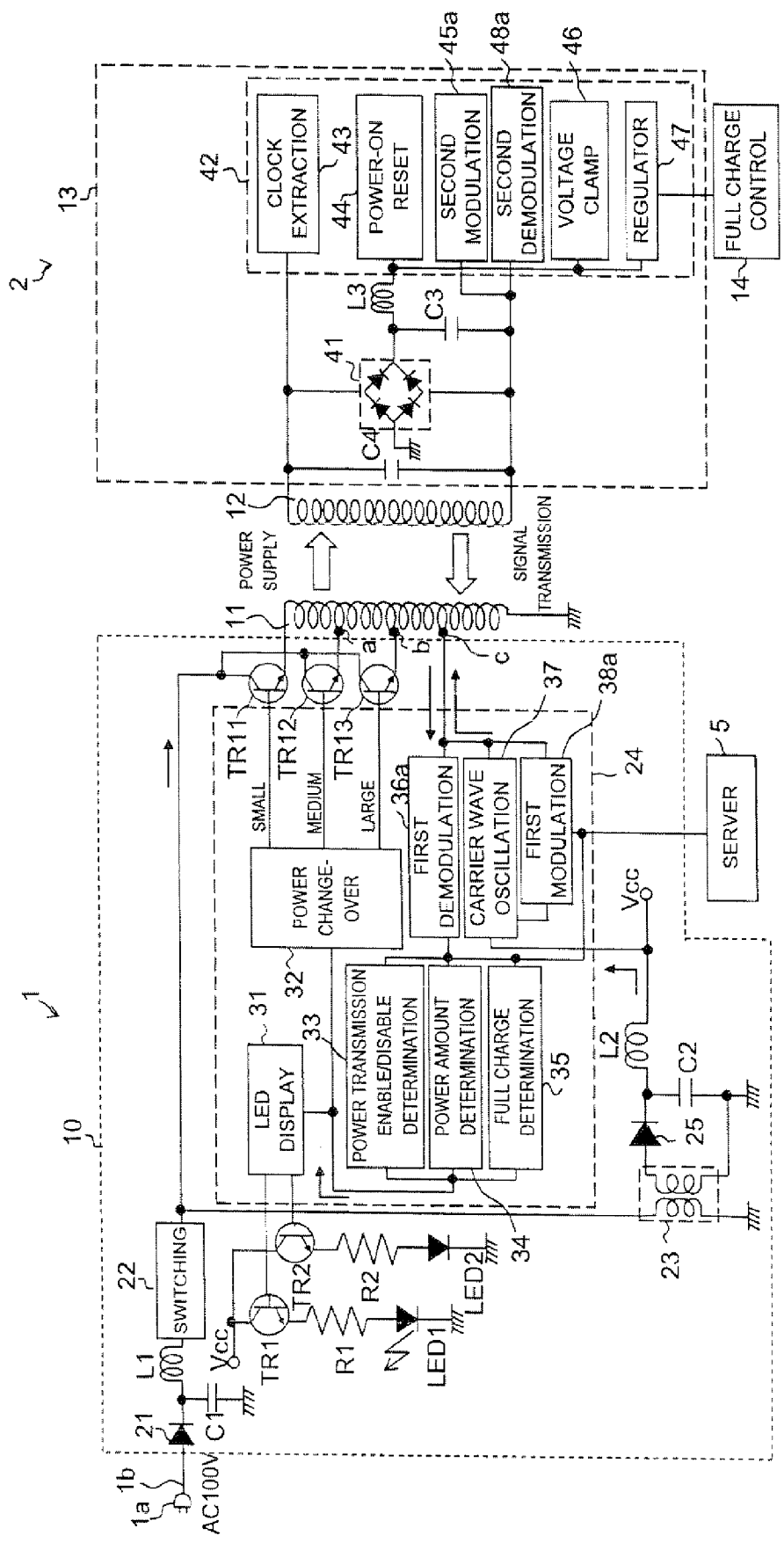
FIG. 22 is a block diagram showing an electric configuration of the power transmission apparatus and the power reception equipment shown in FIG. 21.

FIG. 22 is a block diagram showing an electric configuration of the power transmission apparatus and the power reception equipment shown in FIG. 21. For convenience's sake in the description, the same constituents as in the power supply system shown in FIG. 3 are attached with the same symbols. In FIG. 22, a commercial power supply (AC 100 V) is externally fed to the power transmission apparatus 1 through a cord 1b from an AC plug 1a. The supplied AC 100 V is full-wave rectified in a rectification circuit 21 in a primary side circuit 10, thereafter, smoothed by a smoothing circuit constituted of a coil L1 and a capacitor C1, and converted to a DC voltage. The DC voltage is subjected to switching by a switching circuit 22 to obtain a pulse voltage, and the pulse voltage is supplied to a primary side coil 11 through transistors TR11, TR12, and TR13. Note that the rectification circuit 21, the coil L1, the capacitor C1, and the switching circuit 22 correspond to the power supply circuit 17 shown in FIG. 21.

All of the transistors TR11, TR12, and TR13 are NPN-type transistors. Collectors of all of the transistors are connected to an output terminal of the switching circuit 22. An emitter of the transistor TR11 is connected to one end of the primary side coil 11, and other end of the primary side coil is grounded. The primary side coil 11 has taps a, b, and c thereon in the descending order of a distance from the grounded coil end, i.e., the number of turns. An emitter of the transistor TR12 is connected to the tap a. An emitter of the transistor TR13 is connected to tap b. The tap c is connected to a first demodulation circuit 36a, a carrier wave oscillation circuit 37, and a first modulation circuit 38a in a power transmission control IC 24 which adjusts the level of power to be transmitted from the power transmission apparatus 1, and transmits and receives the information signal. Note that the first demodulation circuit 36a, the carrier wave oscillation circuit 37, and the first modulation circuit 38b correspond to the signal transmission control circuit 19 shown in FIG. 1.

Bases of the transistors TR11, TR12, and TR13 are connected to a power change-over circuit 32 in the power transmission control IC 24. The power transmission control IC 24 is an IC constituted of an LED display circuit 31, the power change-over circuit 32, a power transmission enable/disable determination circuit 33, a power amount determination circuit 34, a full-charge determination circuit 35, the first demodulation circuit 36a, the carrier wave oscillation circuit 37, and the first modulation circuit 38a, and assumes the shape of an IC chip so that a compact and lower-profile shape is achieved. Description will be given of functions and operations of each of the circuits later. Note that the LED display circuit 31, the power change-over circuit 32, the power transmission enable/disable determination circuit 33, the power amount determination circuit 34, the full-charge determination circuit 35, and the transistors TR11, TR12, and TR13 correspond to the power supply control circuit 18 shown in FIG. 21. The transistors TR11, TR12, and TR13 may be other switching elements such as MOSFETs, selector switches, or the like.

The pulse voltage obtained by switching in the switching circuit 22 is supplied to a transformer 23 as well, converted to a predetermined voltage by the transformer 23, thereafter rectified by a rectification circuit 25, smoothed by a smoothing circuit consisted of a coil L2 and a capacitor C2, and converted to a DC voltage. The DC voltage is supplied to control circuits in the primary side circuit 10 as a control power supply Vcc in the primary side circuit 10.

The collectors of NPN-type transistors TR1, TR2, and TR3 are connected to the power supply Vcc; the emitter of the transistor TR1 is connected to an anode of an LED1 through a current limiting resistor R1; and a cathode of the LED1 is grounded. On the other hand, the emitter of the transistor TR2 is connected to an anode of an LED2 through a current limiting resistor 2, and a cathode of the LED2 is grounded. The bases of the transistors TR1 and TR2 are connected to the LED display circuit 31 in the power transmission circuit IC 24.

By this configuration, when the LED display circuit 31 turns on the transistor TR1, the LED1 emits light; and when the LED display circuit 31 turns on the transistor TR2, the LED2 emits light. The LED1 has a function of emitting light in red, yellow, green, purple, or orange according to a signal from the LED display circuit 31, and the LED2 has a function of emitting light in red or green in a similar manner by the action of an unillustrated light control circuit. Note that the transistors TR1 and TR2 may be other switching elements such as MOSFETs.

Next, description will be given of the portable telephone 2 side. A smoothing capacitor C4 and a rectification circuit 41 are connected to both ends of a secondary side coil 12. An induced voltage across the secondary side coil 12 is rectified by the rectification circuit 41, thereafter smoothed by a smoothing circuit constituted of a coil 3 and a capacitor 3, and converted into a DC voltage. The DC voltage is supplied to a power-on reset circuit 44, a voltage clamp circuit 46, and a regulator circuit 47 in a power receiving control IC 42 that performs power receiving control in a secondary side circuit 13.

The power-on reset circuit 44 detects a DC voltage obtained by converting a carrier wave transmitted from a primary side circuit 10 described later, thereby determines that a request for an information signal has been made from the power transmission apparatus 1, resets the power receiving control IC 42, and starts a transmission of the information signal. The voltage clamp circuit 46 clamps the DC voltage obtained by the conversion at a predetermined voltage and thereby prevents the circuits from being subjected to voltage breakdown. The regulator 47 converts the DC voltage obtained by the conversion to a predetermined voltage used for charging, and supplies the predetermined voltage to a charge control circuit 14. The power receiving control IC 42 further including a clock extraction circuit 43, a second demodulation circuit 45a, and a second demodulation circuit 48a, all of which are connected to the secondary side coil 12, performs signal processing for the information signal transmitted or received through the primary side coil 11 and the secondary side coil 12. Note that the power receiving control IC 42 assumes the shape of an IC chip so that a compact and lower-profile shape is achieved.

Since power supply operations by means of the non-contact transmission from the power transmission apparatus 1 to the portable telephone 2, both of which are configured as described, are similar to those from the power transmission apparatus 1 to the portable telephone 2 shown in FIG. 3 that has been described with reference to FIG. 4, description thereof is omitted. In the power supply operations from the power transmission apparatus 1 to the portable telephone 2 shown in FIG. 22, the operations performed by the demodulation circuit 36 and the modulation circuit 45 shown in FIG. 3 are performed by the first demodulation circuit 36a and the second modulation circuit 45a shown in FIG. 22.

Transmitted or received between the power transmission apparatus 1 and the portable telephone 2 having such a configuration are an information signal on power ("code indicating power reception equipment", "information regarding consumed power" and "information regarding full charge") related to power of the portable telephone 2 for the power supply operations and, in addition, a payment information signal related to payment and transmitted between the power transmission apparatus 1 and the server 5. Description will be given of transmission/receiving operations for the payment information signal in the power supply system shown in FIG. 22 below.

When the payment information signal is, at first, transmitted to the first modulation circuit 38a from the server 5 through a network 6 provided in a shop, the first modulation circuit 38a modulates a carrier wave fed from the carrier wave oscillation circuit 37 with the payment information signal and transmits the modulated wave through the primary side coil 11. The modulated wave having been modulated with the payment information signal and fed from the first modulation circuit 38a is transmitted to the secondary side coil 12 by means of the non-contact transmission and demodulated in the second demodulation circuit 48a.

The payment information signal required for processing payment is also transmitted back from the portable telephone 2 in response to the payment information signal demodulated in the second demodulation circuit 48a, or in response to an operation on the portable telephone 2 or the like. The payment information signal to be transmitted from the portable telephone 2 is modulated in the second modulation circuit 45a and transmitted through the secondary side coil 12 in a similar manner to that in transmission of the information signal or power described above. The modulated wave modulated with the payment information signal and fed from the second modulation circuit 45a is transmitted to the primary side coil 11 by means of the non-contact transmission and demodulated in the first demodulation circuit 36a. Thereafter, the demodulated signal is transmitted to the server 5 through the network 6 established in the shop.

In this way, the payment information signal can be transmitted or received between the server 5 and the portable telephone 2 through the power transmission apparatus 1. Therefore, the payment information signal required for processing payment for charges of eating and drinking incurred in the shop, charges of goods purchased in the store, and/or charges of service received from a shop, is transmitted or received between the server 5 and the portable telephone 2, thereby enabling payment using a mobile banking function of the portable telephone 2 to be performed. Next, description will be given of an example of the payment performed using such a function.

Figure 23:
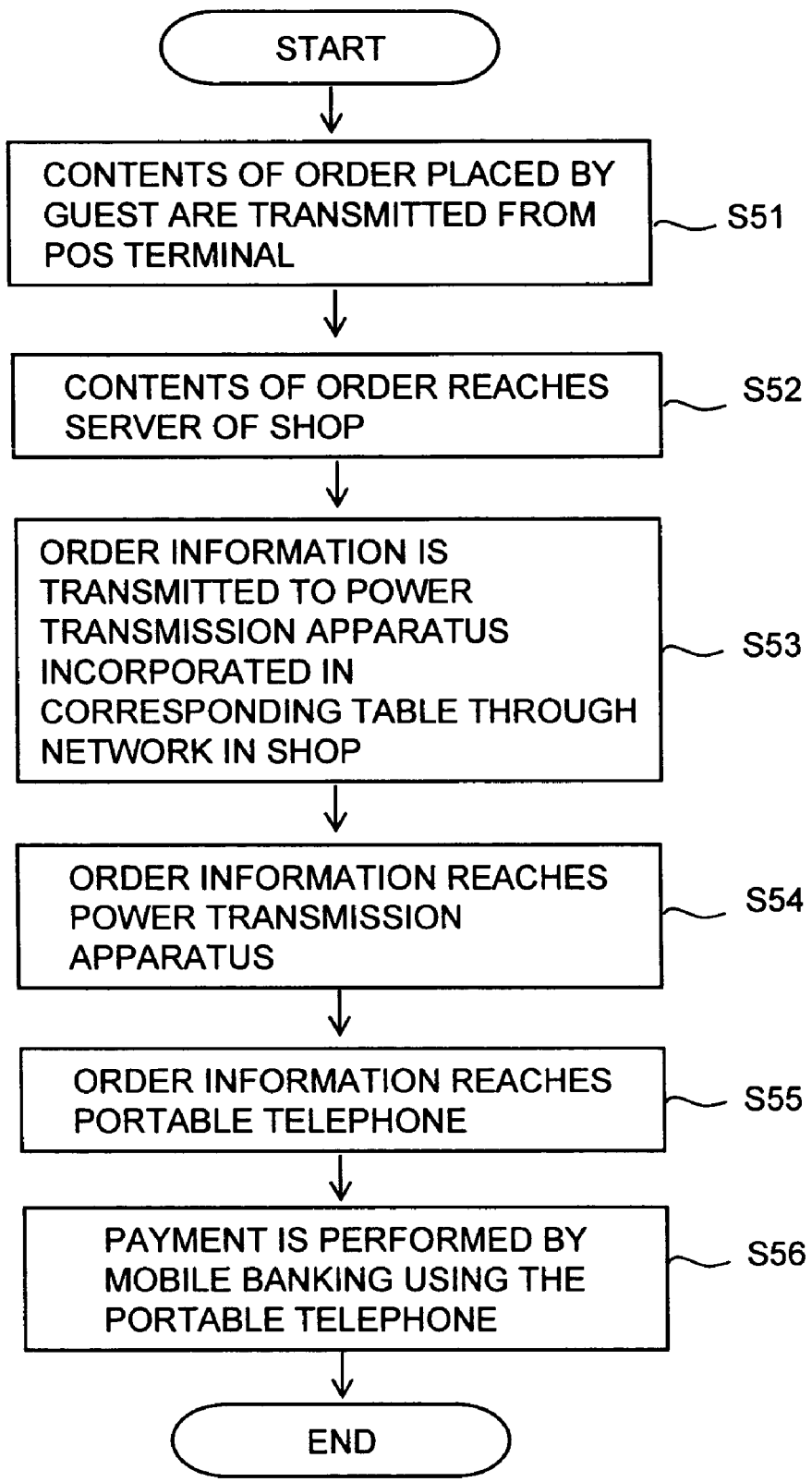
FIG. 23 is a flowchart showing a payment procedure using the power supply system shown in FIG. 21.

FIG. 23 is a flowchart showing the payment procedure using the power supply system shown in FIG. 21. The flowchart shown in FIG. 23 shows a payment procedure in an eating house such as a coffee shop, a restaurant, a fast food shop, or the like. At first, a shop person transmits the contents of an oral order placed by a guest to the server 5 of a shop from a POS terminal 4 (step S51). The contents of the order of the guest transmitted from the POS terminal 4 reach the server 5 of the shop (step S52). Then, the server 5 transmits the order information (payment information signal) based on the contents of the reached order of the guest to the power transmission apparatus 1 embedded in the corresponding table through the network 6 established in the shop (step S53). Thus, the order information reaches the power transmission apparatus 1 (step S54). The power transmission apparatus 1 transmits the order information to the portable telephone 2 through transmission/receiving operations for the payment information signal, and the order information reaches the portable telephone 2 (step S55). Then, payment is performed through the mobile banking function using the portable telephone 2 (step S56).

Figure 24:
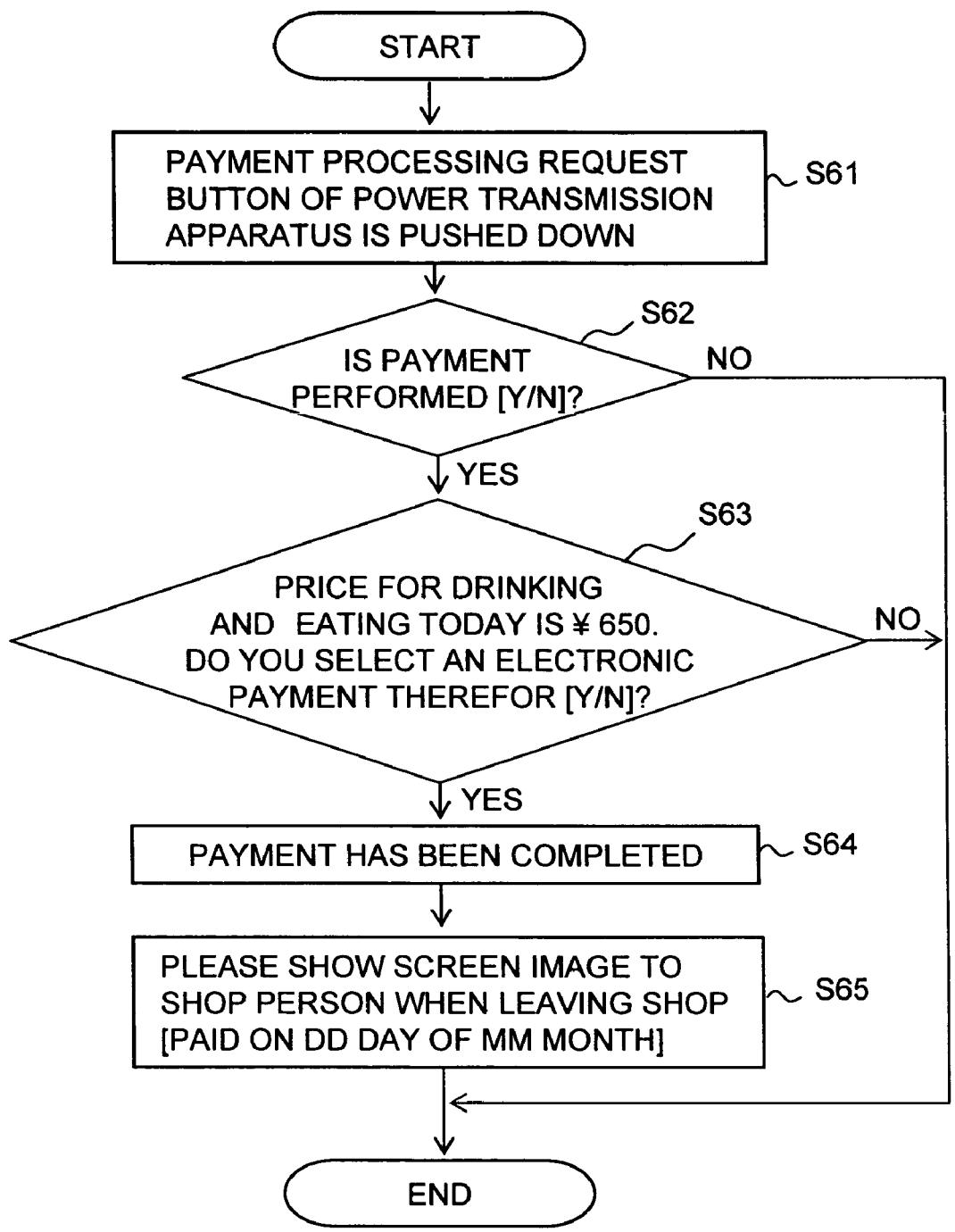
FIG. 24 is a flowchart showing a procedure of mobile banking using the power supply system shown in FIG. 21.

Next, description will be given of the mobile banking procedure using the portable telephone 2 with the reference to FIG. 24. FIG. 24 is a flowchart showing a procedure of mobile banking using the power supply system shown in FIG. 21. The mobile banking using the portable telephone 2 enables payment in a way such that when a payment processing request button 20 provided on the power transmission apparatus 1 shown in FIG. 21 is pushed down, the following message is displayed on a screen of the portable telephone 2. Inputting is done following the message to thereby enable the payment to be completed. First, the payment processing request button 20 is pushed down (step S61), then a message "Is payment performed [Y/N]?" is displayed in order to request confirmation on whether or not payment will be performed (step S62). In this situation, if [N] meaning "No" is selected, the mobile banking using the portable telephone 2 is terminated, and the payment will be transacted in cash or the like at a cashier.

On the other hand, if [Y] meaning "Yes" is selected, a message, "The price for drinking and eating today is ¥ 650. Do you select an electronic payment [Y/N]?" is displayed (step S63). In this situation, if [N] meaning "No" is selected, the mobile banking using the portable telephone 2 is terminated and payment will be transacted in cash or the like at a cashier. On the other hand, if [Y] meaning "Yes" is selected, payment in the mobile banking is performed and a message, "Payment has been completed" is displayed (step S64). In addition, in order to prove the completion of the payment with mobile banking, a message, "Please show this screen image to a shop person when leaving this shop. [Paid on DD day of MM month]" is displayed (step S65). The guest can leave the shop by simply showing the message to a shop person. That is, since the guest can perform payment processing at his or her own table, there will be no possibility of many guests paying at a time at a busy casher and being kept waiting. Moreover, since no necessity arises for a shop person to standby at the cashier, both the guests and the shop are benefited.

While, in the embodiment, description is given of the payment at a shop such as an eating house, the power supply system shown in FIG. 21 can also be used in payment for a room charge of accommodations such as a hotel or an inn. For example, the power transmission apparatus 1 is embedded in utensils, such as a top plate of a table in a room of the accommodation, a top or a side of a refrigerator, or the like, and when the portable telephone 2 is placed on a predetermined portion of the utensils in which the power transmission apparatus 1 is embedded, charging of the portable telephone 2 starts. The server 5 of the accommodation and the power transmission apparatus 1 in each room are connected through the network 6, and thereby information on the room charge and the number of guests is transmitted from the server 5 to the power transmission apparatus 1.

The cost of food and drink supplied in a refrigerator and consumed by a guest in a room, when the refrigerator and the server 5 are connected to each other, can be transmitted to the power transmission apparatus 1 of the room through the server 5. When the guest checks out the hotel, the guest places the portable telephone 2 on a utensil at a portion thereof where the power transmission apparatus 1 is embedded and pushes down the payment processing request button 20, thereby enabling payment therefor to be performed in a similar manner to that in the shop. This method has the advantage that, since the guests can perform payment in their own respective rooms, the front desk will not be crowded with check-out guests and it is unnecessary for the hotel employees to stand by for facilitating smooth check-out at the front desk.

Figure 25:
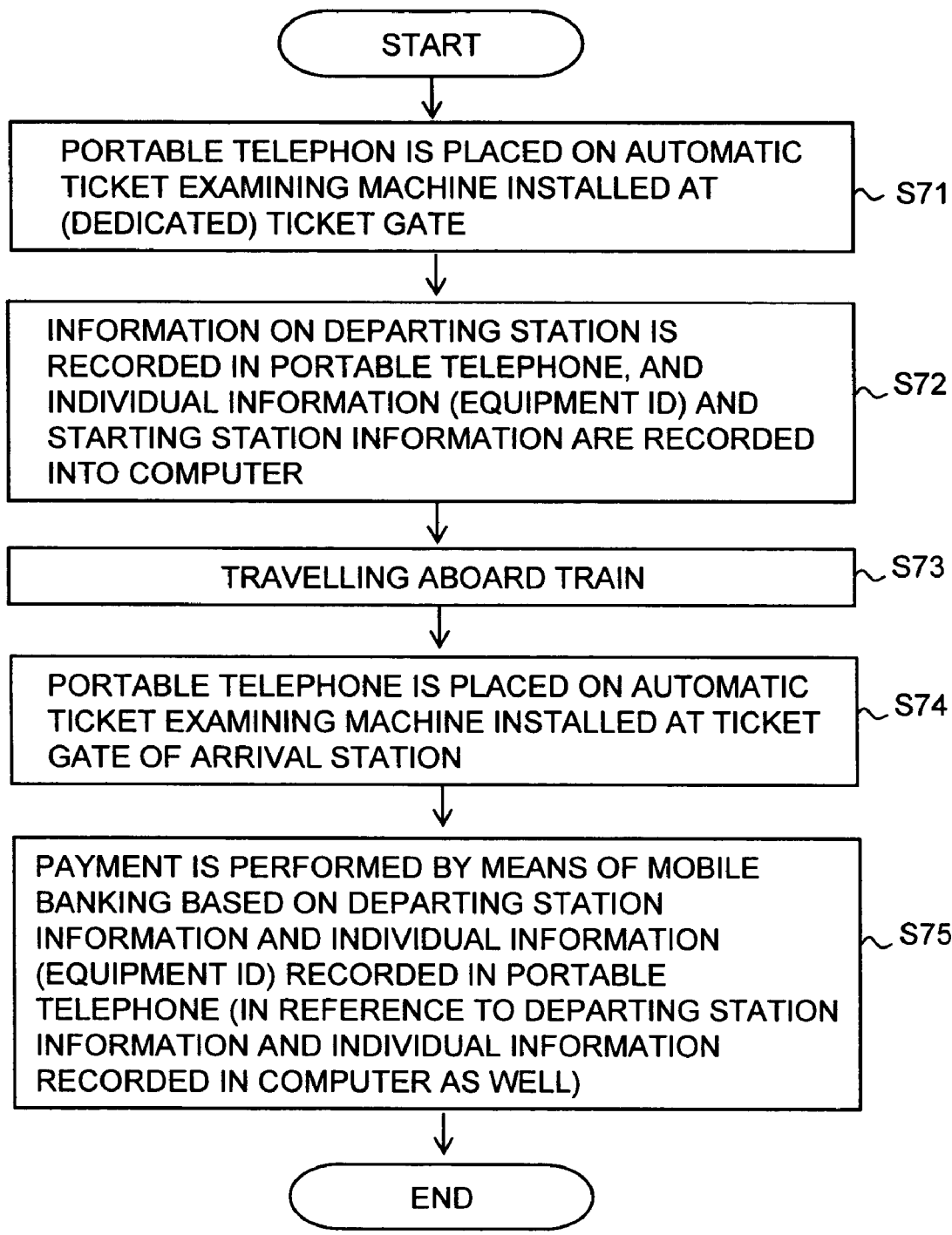
FIG. 25 is a flowchart showing another payment procedure using the power supply system shown in FIG. 21.

FIG. 25 is a flowchart showing another payment procedure using the power supply system shown in FIG. 21. The flowchart shown in FIG. 25 shows a payment procedure for a railway fare or the like. In this case, the power transmission apparatus 1 in FIG. 21 is embedded in an automatic ticket examining machine installed at a (dedicated) ticket gate. The power transmission apparatus 1 is connected to a server 5 of a station through a network 6.

First, when a portable telephone 2 is placed at a predetermined portion of the automatic ticket examining machine in which the power transmission apparatus 1 is embedded, rapid charging of the portable telephone 2 starts (step S71). Then, not only is departing station information recorded in the portable telephone 2, but personal information (ID information of the portable telephone 2) and the departing station information are recorded in a computer of a railway company connected to the server 5 of the station (step S72). Then, a user carrying the portable telephone 2 takes a train to travel (step S73).

Next, the user who has reached the arrival station at the destination places the portable telephone 2 on a power transmission apparatus 1 embedded in an automatic ticket examining machine installed at ticket gate of the arrival station (step S74). Then, the fare is paid by means of the mobile banking according to the departing station information and the personal information (equipment ID of the portable telephone 2) recorded in the portable telephone 2. Here, the departing station information and the personal information recorded in the computer of the railway company are also accessed through a server 5 of the arrival station (step S75). In this way, the user is relieved from troublesome work that includes finding a fare to the destination and buying a ticket. This method has the advantage that, since no cash is paid, the user does not need to have cash in hand, or the user can use the railway service even in case the user happens to have no cash in hand. Furthermore, the user does not need to carry a plurality of prepaid cards of different railway companies, which the user should otherwise carry.

Figure 26:
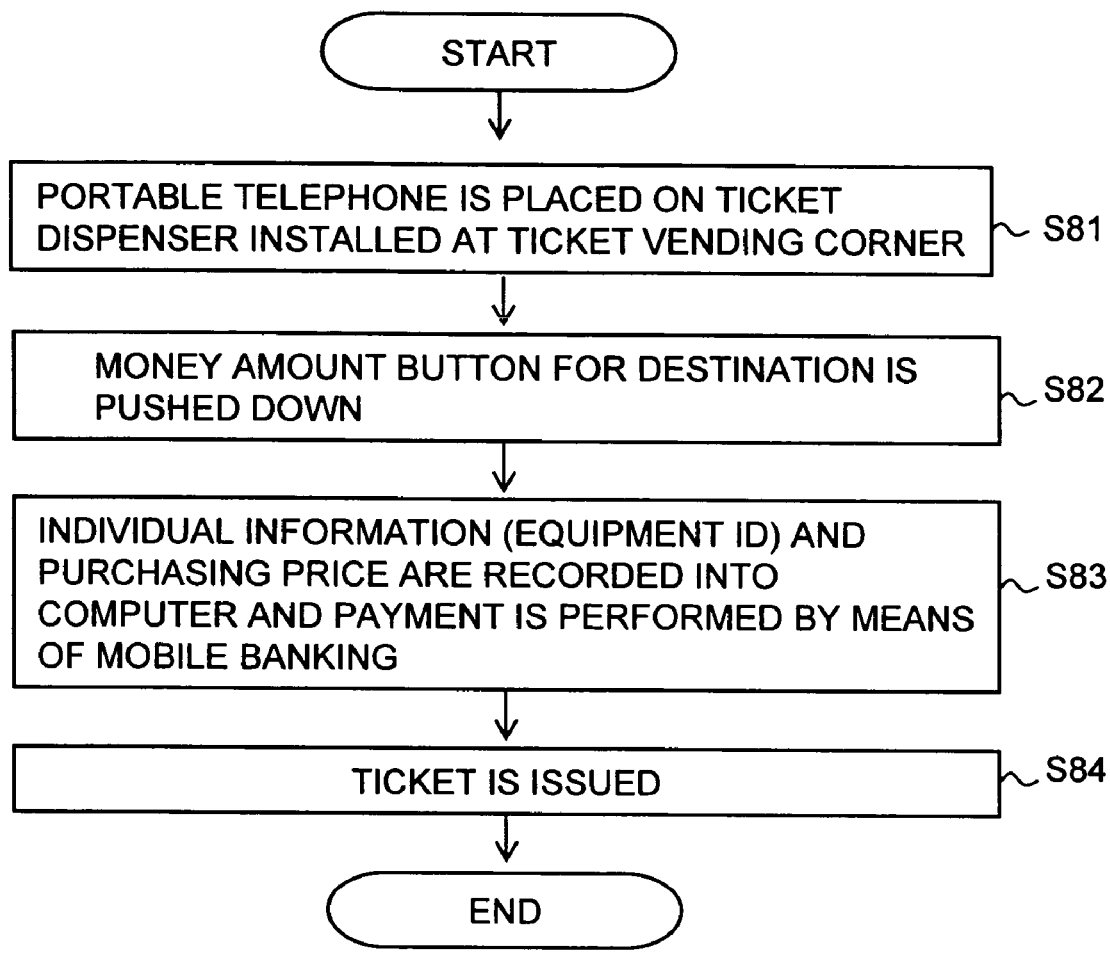
FIG. 26 is a flowchart showing still another payment procedure using the power supply system shown in FIG. 21.
Figure 27:
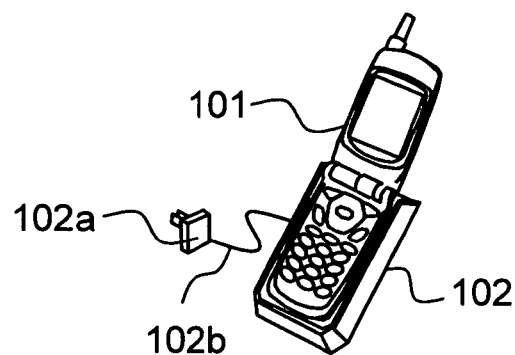
FIG. 27 is a view showing an outer appearance of a conventional power supply system.
Figure 28:
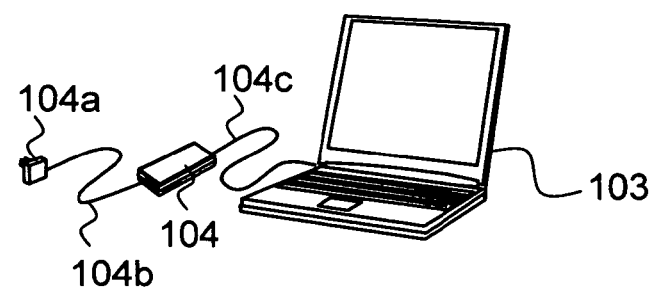
FIG. 28 is a view showing an outer appearance of another conventional power supply system.
Figure 29:
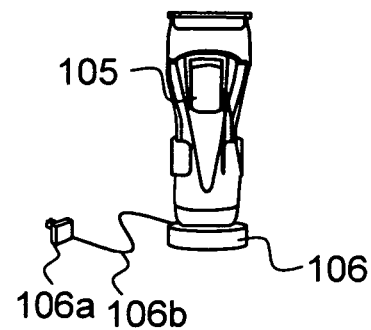
FIG. 29 is a view showing an outer appearance of still another conventional power supply system.

FIG. 26 is a flowchart showing still another payment procedure using the power supply system shown in FIG. 21. The flowchart shown in FIG. 26 shows a payment procedure for paying for a ticket or the like. In this example, it is assumed, by referring to FIG. 21, that the power transmission apparatus 1 is embedded in a ticket dispenser installed at a ticket vending corner in the station. The ticket dispenser is connected to the server 5 of the station, and the power transmission apparatus 1 is connected to the server 5 of the station through the network 6 of the station.

First, when the portable telephone 2 is placed at a predetermined potion of the ticket dispenser in which the power transmission apparatus 1 is embedded, rapid charging of the portable telephone 2 starts (step S81). Then, when a money amount button of the ticket dispenser on which a fare to a destination is displayed is pushed down (step S82), personal information (equipment ID of the portable telephone 2) and ticket purchasing price information are recorded into the computer of the railway company connected to the server 5, and the purchasing price is paid by means of mobile banking (step S83). Then, a ticket is issued from the ticket dispenser (step S84). This method has the advantage that decrease in power of the battery of the portable telephone 2 can be prevented because a supplementary battery charge is performed when the ticket is purchased, and the user does not need to have cash in hand or can use the railway service even in case the user happens to have no cash in hand because no cash is paid. Furthermore, the user does not need to carry a plurality of prepaid cards of different railway companies, which the user should otherwise carry.

Note that while the description has been given by using a portable telephone or a notebook PC as power reception equipment equipped with a power supply system of the embodiments as examples, the power supply system can be applied to other electronic equipment without specifically limiting the application thereof to the portable telephone or the notebook PC.

Although described hereto are the examples in which a power transmission apparatus or apparatuses are embedded in the top plate of a desk, the shelves of a rack, the bottom plates of a lockable locker, the holder for holding a power reception equipment, the dashboard and/or the console box of an automobile, the top mat, the floor, the floor covering fabrics, and the wall, the power transmission apparatus or apparatuses may be embedded in other utensils, other structural members, and the like.

It is to be understood that the present invention is not limited to the embodiments as described above and that within the scope of the appended claims, the invention may be practiced other than as specifically described.

Since the power transmission apparatus of the power supply system related to the present invention can select from among three levels of power to be transmitted, large, medium, and small according to power required by the power reception equipment and transmit the selected power thereto, a single power transmission apparatus can supply power to different types of electronic equipment.

Since a protrusion or a mark is provided on the power transmission apparatus and a depression or another mark is provided on the power reception equipment, even when different types of power reception equipment are used, it is possible to position the power reception equipment at the location for optimum power reception.

Since LEDs indicating operating states are provided on the power transmission apparatus, the user can easily recognize the operating states of the power transmission apparatus.

Since a pair of power transmission electrodes for supplying power to the power transmission apparatus in a contact manner, and a current detection circuit monitoring current flowing between the power transmission electrodes of the pair, and a power route change-over circuit are added to the configuration, power can be also supplied to the conventional power reception equipment that performs charging by receiving power through power receiving electrodes of contact type.

Since the power transmission apparatus is embedded in the top plate of a desk, the shelves of a rack, the bottom plates of a lockable locker, the holder for holding a power reception equipment, the dashboard and/or the console box of an automobile, the top mat, the wall, the side surface of a utensil, the floor, and the floor covering fabric, space saving can be realized.

An information signal can be transmitted or received between a portable telephone and a server connected to the power transmission apparatus. Therefore, charges can be paid for by using the mobile banking function of the portable telephone in a place where there are provided a utensil or utensils having the power transmission apparatus or apparatuses embedded therein, thereby making it unnecessary to pay at a cashier of an eating house or a front desk of a hotel.

In a railway station, paying the fare by using the mobile banking function of the portable telephone makes it possible to buy a ticket without inputting money into a ticket dispenser. Furthermore, in a case where the power transmission apparatus is embedded in an automatic ticket examining machine, paying the fare is carried out by means of the portable telephone. Consequently, the user can use transportation service provided by different railway companies without actually buying tickets and without carrying a plurality of prepaid cards.

Therefore, according to the present invention, it is possible to realize a power supply system capable of supplying power to different types of electronic equipment from a single power transmission apparatus, thereby achieving space saving, and performing payment for public service and charges.

What is claimed is:

1. A power transmission apparatus comprising:
a primary side coil; and
a primary side circuit for feeding to the primary side coil a pulse voltage resulting from switching a DC voltage obtained by rectifying and smoothing commercial power and for supplying power in DC voltage to power reception equipment through the primary side coil,
wherein the power transmission apparatus is configured to receive an information signal containing information regarding the power reception equipment from the power reception equipment through a secondary side coil separated from and magnetically connected to the primary side coil and through the primary side coil, and
wherein the power transmission apparatus further comprises a power adjusting section configured to adjust, upon receiving the information signal, a level of power to be transmitted to the power reception equipment.

2. The power transmission apparatus according to claim 1, wherein the primary side coil comprises either a coil with a plurality of taps each arranged on the coil at different turns thereof or comprises a plurality of coils each having a different number of turns, and the power adjusting section has a power change-over section for selecting, according to the information signal, one from among the plurality of taps to which the pulse voltage is applied or has a power change-over section for selecting, according to the information signal, one from among the plurality of coils to which the pulse voltage is applied.

3. The power transmission apparatus according to claim 2, wherein the power adjusting section comprises:
a carrier wave oscillation circuit, included in the primary side circuit, for regularly supplying a carrier wave to the primary side coil; and
a demodulation circuit, included in the primary side circuit, for receiving an information signal through the primary side coil and demodulating the received information signal, the information signal including information regarding the power reception equipment, modulated, and transmitted from the power reception equipment in response to the carrier wave,
wherein the power adjusting section is configured to adjust, in accordance with the information signal demodulated by the demodulation circuit, the level of power to be transmitted through a change-over operation performed by the power change-over section.

4. The power transmission apparatus according to claim 3, wherein the power adjusting section further comprises:

a carrier wave detection circuit, included in the secondary side circuit, for detecting the carrier wave transmitted to the secondary side coil;
a clock extraction circuit, included in the secondary side circuit, for extracting a clock signal necessary for modulation from the carrier wave; and
a modulation circuit, included in the secondary side circuit, for modulating the carrier wave with the information signal based on the clock signal and transmitting the modulated signal through the secondary side coil when the carrier wave detection circuit detects the carrier wave.

5. The power transmission apparatus according to claim 3, wherein a coil configured to have the pulse voltage applied thereto, and a coil configured to have the carrier wave applied thereto and the information signal received therethrough are an identical coil forming the primary side coil.

6. The power transmission apparatus according to claim 3, wherein a coil configured to have the pulse voltage applied thereto, and a coil configured to have the carrier wave applied thereto and the information signal received therethrough are different coils forming the primary side coil.

7. The power transmission apparatus according to claim 3, wherein the power adjusting section has a function of recognizing the information regarding the power reception equipment based on the information signal demodulated by the demodulation circuit.

8. The power transmission apparatus according to claim 3, wherein the information signal transmitted from the power reception equipment includes a "code indicating power reception equipment".

9. The power transmission apparatus according to claim 3, wherein said apparatus is configured to transmit power to the power reception equipment based on the "code indicating power reception equipment" included in the information signal when equipment that can receive power is positoned on the power transmission apparatus.

10. The power transmission apparatus according to claim 3, further comprising a power transmission enable/disable determination circuit for determining, based on the "code indicating power reception equipment" included in the information signal, whether or not equipment that can receive power is positioned on the power transmission apparatus.

11. The power transmission apparatus according to claim 10,
wherein, the power transmission enable/disable determination circuit is configured to control, by determining that equipment that can receive power is positioned on the power transmission apparatus, the power change-over section so that the pulse voltage will be applied to the primary side coil, if the "code indicating being power reception equipment" included in the information signal is a predetermined "code indicating being power reception equipment", and
power transmission enable/disable determination circuit is configured to control, by determining that equipment that can receive power is not positioned on the power transmission apparatus, the power change-over section so that the pulse voltage will not be applied to the primary side coil, if the "code indicating power reception equipment" included in the information signal is not the predetermined "code indicating power reception equipment".

12. The power transmission apparatus according to claim 3, further comprising, a power amount determination circuit, wherein the information signal includes "information regarding consumed power", and the power amount determination circuit is configured to determine the level of power to be transmitted based on the "information regarding consumed power" included in the information signal.

13. The power transmission apparatus according to claim 12, wherein the power amount determination circuit is configured to control the power change-over section according to the determined level of power to be transmitted.

14. The power transmission apparatus according to claim 3, wherein the information signal includes "information regarding full charge", if the power reception equipment has a battery that is configured to be charged with power transmitted from the power transmission apparatus.

15. The power transmission apparatus according to claim 3, wherein said apparatus is configured to stop power transmission when the power reception equipment is fully charged, based on the "information regarding full charge" included in the information signal.

16. The power transmission apparatus according to claim 3, further comprising, a full-charge determination circuit for determining, based on the "information regarding full charge" included in the information signal, whether or not the power reception equipment is fully charged.

17. The power transmission apparatus according to claim 16, wherein the full-charge determination circuit is configured to control the power change-over section, by determining that the power reception equipment is not fully charged, the full-charge determination circuit, so that the pulse voltage will be applied to the primary side coil if the "information regarding full charge" included in the information signal does not indicate that the power reception equipment is not fully charged, and the full-charge determination circuit is configured to control, by determining that the power reception equipment is fully charged, the power change-over section so that the pulse voltage will not be applied to the primary side coil if the "information regarding full charge" included in the information signal indicates that the power reception equipment is fully charged.

18. The power transmission apparatus according to claim 2, wherein the power adjusting section comprises:
   a carrier wave oscillation circuit, included in the primary side circuit, for regularly supplying a carrier wave to the primary side coil; and
   a demodulation circuit, included in the primary side circuit, for receiving an information signal through the primary side coil and demodulating the received information signal, the information signal including information regarding the power reception equipment, modulated, and transmitted from the power reception equipment in response to the carrier wave,
   wherein a transmission efficiency of the power to be transmitted and a transmission efficiency of the information signal are configured to change at substantially an identical rate when a relative position between the power transmission aparatus and the power reception equipment changes,
   wherein the power adjusting section further comprises a power transmission enable/disable determination circuit for determining, according to the transmission efficiency of the information signal received by the demodulation circuit, whether or not the relative position between the power transmission apparatus and the power reception equipment is suitable for transmitting power.

19. The power transmission apparatus according to claim 18, wherein the power transmission enable/determination circuit is configured to control, when the transmission efficiency of the information signal received by the demodulation circuit is larger than a predetermined value and by determining that the relative position between the power transmission apparatus and the power reception equipment is suitable for transmitting power, the power change-over section so that the voltage pulse will be applied to the primary side coil, and
the power transmission enable/disable determination circuit is configured to control, when the transmission efficiency of the information signal received by the demodulation circuit is smaller than the predetermined value and by determining that the relative position between the power transmission apparatus and the power reception equipment is not suitable for transmitting power, the power change-over section so that the voltage pulse will not be applied to the primary side coil.

20. The power transmission apparatus according to claim 1, wherein the primary side circuit includes a current voltage detection circuit for detecting a change in current flowing through the primary side coil and/or a change in voltage appearing across the primary side coil.

21. The power transmission apparatus according to claim 20, wherein said power transmission apparatus is configured to transmit power to the power reception equipment when equipment that can receive power is positioned on the power transmission apparatus and according to the change in the current and/or the voltage detected by the current voltage detection circuit.

22. The power transmission apparatus according to claim 20, wherein the power adjusting section is configured to recognized information regarding the power reception equipment according to the change in the current and/or the voltage detected by the current voltage detection circuit.

23. The power transmission apparatus according to claim 2,
   wherein the primary side circuit includes a current voltage detection circuit for detecting a change in current flowing through the primary side coil and/or a change in voltage appearing across the primary side coil, and
   said power transmission apparatus is configured to switch over the power change-over section so as to adjust the level of power to be transmitted according to the change in the current and/or the voltage detected by the current voltage detection circuit.

24. The power transmission apparatus according to claim 23, further comprising, a power transmission enable/disable determination circuit for determining, according to the change in the current and/or the voltage detected by the current voltage detection circuit, whether or not equipment that can receive power is placed on the power transmission apparatus.

25. The power transmission apparatus according to claim 24,
   wherein the power transmission enable/disable determination circuit is configured to control, when a predetermined change in the current and/or the voltage is detected by the current voltage detection circuit and by determining that equipment that can receive power is placed on the power transmission apparatus, the power change-over section so that the voltage pulse will be applied to the primary side coil, and
   the power transmission enable/disable determination circuit is configured to control, when the predetermined change in the current and/or the voltage is not detected by the current voltage detection circuit and by determining that equipment that can receive power is not placed on the power transmission apparatus, the power change-over section so that the voltage pulse will not be applied to the primary side coil.

26. The power transmission apparatus according to claim 23, further comprising:
a power amount determination circuit for determining the level of power to be transmitted according to the change in the current and/or the voltage detected by the current voltage detection circuit.

27. The power transmission apparatus according to claim 26, wherein the power amount determination circuit is configured to control the power change-over section according to the determined level of power to be transmitted.

28. The power transmission apparatus according to claim 20, wherein said power transmission apparatus is configured to stop transmitting power to said power reception equipment if the power reception equipment has a battery that is configured to be charged with the power transmitted from the power transmission apparatus and if it is determined, according to the change in the current and/or the voltage detected by the current voltage detection circuit, that the power reception equipment is fully charged.

29. The power transmission apparatus according to claim 23, further comprising a full-charge determination circuit for determining whether or not the power reception equipment is fully charged according to the change in the current and/or the voltage detected by the current voltage detection circuit, if the power reception equipment has a battery that is charged with power transmitted from the power transmission apparatus.

30. The power transmission apparatus according to claim 29,
wherein the full-charge determination circuit is configured to control, when a predetermined change in the current and/or the voltage is detected by the current voltage detection circuit and by determining that the power reception equipment is not fully charged, the power change-over section so that the voltage pulse will be applied to the primary side coil and
the full-charge determination circuit is configured to control, when the predetermined change in the current and/or the voltage is not detected by the current voltage detection circuit and by determining that the power reception equipment is fully charged, the power change-over section so that the voltage pulse will not be applied to the primary side coil.

31. The power transmission apparatus according to claim 1,
wherein one of a protrusion and a depression is provided on a face of the power transmission apparatus and other of a protrusion and a depression is provided on a face, facing the face of the power transmission apparatus, of the power reception equipment, and
the power transmission apparatus and the power reception equipment are positioned relative to each other by engaging the protrusion with the depression, when power is transmitted from the power transmission apparatus to the power reception equipment.

32. The power transmission apparatus according to claim 1,
wherein marks indicating a region through which power can be transmitted are provided respectively on a face of the power transmission apparatus and a face, facing the face of the power transmission apparatus, of the power reception equipment so that the power transmission apparatus and the power reception equipment are positioned relative to each other, when power is transmitted from the power transmission apparatus to the power reception equipment.

33. The power transmission apparatus according to claim 1, wherein a display section for indicating the level of power to be transmitted from the power transmission apparatus is provided thereon.

34. The power transmission apparatus according to claim 1, wherein a display section is provided so as to indicate that the power reception equipment is fully charged, if the power reception equipment has a battery that is charged with power transmitted from the power transmission apparatus.

35. The power transmission apparatus according to claim 1, wherein a display section is provided so as to indicate that the power reception equipment has been removed from on the power transmission apparatus after power has been transmitted from the power transmission apparatus to the power reception equipment.

36. The power transmission apparatus according to claim 1, wherein a display section is provided so as to indicate, when a position of the power reception equipment relative to the power transmission apparatus is not suitable for transmitting power, that the position of the power reception equipment relative to the power transmission apparatus is not suitable for transmitting power.

37. The power transmission apparatus according to claim 1,
wherein, the power transmission apparatus comprises:
a pair of power transmission electrodes in contact with a pair of power receiving electrodes for supplying power to said power receiving electrodes; when the power reception equipment is such equipment configured to receive power through the pair of power receiving electrodes;
an inter-electrode current detection circuit for detecting current flowing between the pair of power transmission electrodes when the pair of power transmission electrodes and the pair of power receiving electrodes of a contact type of the power reception equipment are in contact with each other; and
a power route change-over circuit for selecting between a route for supplying the power to be transmitted to the pair of power transmission electrodes and a route for supplying the power to be transmitted to the primary side coil according to the detecting result by the inter-electrode current detection circuit.

38. The power transmission apparatus according to claim 1, wherein the power transmission apparatus is incorporated in a utensil.

39. The power transmission apparatus according to claim 38, wherein the utensil is a top plate of a desk.

40. The power transmission apparatus according to claim 38, wherein the utensil is a shelf.

41. The power transmission apparatus according to claim 38, wherein the utensil is a bottom plate that forms a lockable storage compartment.

42. The power transmission apparatus according to claim 38, wherein the utensil is a holder for holding the power reception equipment.

43. The power transmission apparatus according to claim 38, wherein the utensil is a dashboard and/or a console box of an automobile.

44. The power transmission apparatus according to claim 38, wherein the utensil is a top mat.

45. The power transmission apparatus according to claim 38, wherein the power transmission apparatus is incorporated in a side surface of the utensil.

46. The power transmission apparatus according to claim 1, wherein the power transmission apparatus is incorporated in a floor, a carpet for covering a floor, or a wall.

47. A power supply system comprising
a power transmission apparatus comprising:
   a primary side coil; and
   a primary side circuit for feeding to the primary side coil a pulse voltage resulting from a switching a DC voltage obtained by rectifying and smoothing commercial power and for supplying power in DC voltage to power reception equipment through the primary side coil,
   wherein the power transmission apparatus is configured to receive an information signal containing information regarding the power reception equipment from the power
   reception equipment through a secondary side coil separated from and
   magnetically connected to the primary side coil and through the primary side coil, and
   wherein the power transmission apparatus further comprises a power adjusting section configured to adjust upon receiving the information signal, a level of power to be transmitted to the power reception equipment,
said power supply system further comprising power reception equipment for receiving power from the powertransmission apparatus,
wherein the power transmission apparatus includes a signal transmission control circuit for transmitting an information signal among the power transmission apparatus, the power reception equipment and an external apparatus connected to the power transmission apparatus.

48. The power supply system according to claim 47, wherein the primary side circuit comprises:
a carrier wave oscillation circuit for regularly supplying a carrier wave to the primary side coil;
a first demodulation circuit for receiving through the primary side coil and demodulating the information signal modulated by and transmitted from the power reception equipment, and for feeding the demodulated information signal to the power adjusting section and the external apparatus; and
a first modulation circuit for modulating the carrier wave supplied from the carrier wave oscillation circuit with the information signal supplied from the external apparatus, and transmitting the modulated signal through the primary side coil,
wherein a secondary side circuit comprises:
a carrier wave detection circuit for detecting the carrier wave transmitted to the secondary side coil;
a clock extraction circuit for extracting a clock signal required for modulation from the carrier wave; and
a second modulation circuit for modulating the carrier wave with the information signal transmitted from the power reception equipment based on the clock signal and for transmitting the modulated signal through the secondary side coil, when the carrier wave detection circuit detects the carrier wave.

49. The power supply system according to claim 47, wherein said power supply system is configured to supply power to the power reception equipment positioned in close proximity to the power transmission apparatus,
the information signal transmitted from the signal transmission control circuit and transmitted between the external apparatus and the power reception equipment through the power transmission apparatus is a signal necessary for payment, and
said power supply system is configured to perform the payment by utilizing the power reception equipment.

50. The power supply system according to claim 47,
wherein the power transmission apparatus is incorporated in a top plate of a table provided in a shop,
the power transmission apparatus is configured to supply power to the power reception equipment positioned on the top plate,
the external apparatus is a server provided in the shop,
the information signal transmitted from the signal transmission control circuit and transmitted between the server and the power reception equipment through the power transmission apparatus is a signal required for performing payment for wining and dining in the shop, goods purchased in the shop, and/or service provided by the shop, and
said power supply system is configured to perform the payment by utilizing the power reception equipment.

51. The power supply system according to claim 47,
wherein the power transmission apparatus is incorporated in a utensil provided in lodging facilities,
the power transmission apparatus is configured to supply power to the power reception equipment positioned in close proximity to the utensil,
the external apparatus is a server provided in the lodging facilities,
the information signal transmitted from the signal transmission control circuit and transmitted between the server and the power reception equipment through the power transmission apparatus is a signal required for performing payment for wining and dining in the lodging facilities, goods purchased in the lodging facilities, and/or service provided by the lodging facilities, and
said power supply is configured to perform the payment by utilizing the power reception equipment.

52. The power supply system according to claim 47,
wherein the power transmission apparatus is incorporated in a ticket dispenser connected to a server provided at a station,
the power transmission apparatus supplies power to the power reception equipment positioned in close proximity to the ticket dispenser,
the external apparatus is the server,
the information signal transmitted from the signal transmission control circuit and transmitted between the server and the power reception equipment through the power transmission apparatus is a signal including personal information of a user of the power reception equipment required for performing payment for a ticket purchased through the ticket dispenser, and
said power supply system is configured to perform the payment by utilizing the power reception equipment.

53. The power supply system according to claim 47
wherein the power transmission apparatus is incorporated in an automatic ticket examining machine provided at a ticket gate in a station,
the power transmission apparatus supplies power to the power reception equipment positioned in close proximity to the automatic ticket examining machine,
the external apparatus is a server provided at the station,
the information signal transmitted from the signal transmission control circuit and transmitted between the server and the power reception equipment through the power transmission apparatus is a signal including information regarding a departing station and personal information of a user of the power reception equipment required for performing payment of a fare, and said power supply system is configured to perform the payment by utilizing the power reception equipment.

54. A power transmission apparatus for receiving commercial power and supplying power in DC voltage in a non-contact manner to power reception equipment that is separate and independent from the power transmission apparatus, wherein the power transmission apparatus is configured to transmit power to the power reception equipment through magnetically coupled elements that are separate and independent from each other and are respectively provided in the power transmission apparatus and the power reception equipment, wherein the power reception equipment is configured to transmit an information signal including information regarding the power reception equipment to the power transmission apparatus through the magnetically coupled elements, and wherein the power transmission apparatus comprises a power adjusting section for adjusting a level of power to be transmitted upon receiving the information signal.

* * * * *